(12) United States Patent
Tsukagoshi

(10) Patent No.: US 8,896,663 B2
(45) Date of Patent: Nov. 25, 2014

(54) TRANSMITTING DEVICE, RECEIVING DEVICE, COMMUNICATION SYSTEM AND PROGRAM

(75) Inventor: Ikuo Tsukagoshi, Tokyo (JP)

(73) Assignee: Sony Corporation (JP)

( * ) Notice: Subject to any disclaimer, the term of this patent is extended or adjusted under 35 U.S.C. 154(b) by 654 days.

(21) Appl. No.: 12/807,791

(22) Filed: Sep. 14, 2010

(65) Prior Publication Data

US 2011/0074920 A1 Mar. 31, 2011

(30) Foreign Application Priority Data

Sep. 29, 2009 (JP) ................................ P2009-224013

(51) Int. Cl.
*H04N 13/00* (2006.01)
*H04N 19/597* (2014.01)

(52) U.S. Cl.
CPC ..... *H04N 19/00769* (2013.01); *H04N 13/0048* (2013.01); *H04N 13/004* (2013.01); *H04N 13/0029* (2013.01)
USPC .......................................................... 348/43

(58) Field of Classification Search
CPC ............ H04N 13/0048; H04N 13/004; H04N 13/0029; H04N 19/00769
See application file for complete search history.

(56) References Cited

U.S. PATENT DOCUMENTS

| | | | |
|---|---|---|---|
| 5,459,514 A * | 10/1995 | Sakamoto et al. ....... | 375/240.11 |
| 5,767,898 A | 6/1998 | Urano et al. | |
| 2007/0229557 A1 * | 10/2007 | Okumura et al. ............ | 345/698 |
| 2008/0152241 A1 * | 6/2008 | Itoi et al. ....................... | 382/234 |
| 2009/0092326 A1 * | 4/2009 | Fukuhara et al. ............. | 382/233 |
| 2010/0020160 A1 * | 1/2010 | Ashbey .......................... | 348/43 |

FOREIGN PATENT DOCUMENTS

| | | |
|---|---|---|
| JP | 08-070475 | 3/1996 |
| JP | 09-138384 A | 5/1997 |
| JP | 2000-036969 A | 2/2000 |
| JP | 2003-045343 A | 2/2003 |
| JP | 2004048293 A | 2/2004 |
| JP | 2004336104 A | 11/2004 |
| WO | 2007/066710 | 6/2007 |

OTHER PUBLICATIONS

Office Action from Japanese Application No. 2009-224013, dated Apr. 30, 2013.
Office Action from Japanese Application No. 2009-224013, dated Jul. 9, 2013.
European Search Report from EP Application No. 10177805, dated Aug. 19, 2013.
Office Action from China Application No. 201010294296.4, dated Sep. 11, 2013.

\* cited by examiner

*Primary Examiner* — Joseph Ustaris
*Assistant Examiner* — Jill Sechser
(74) *Attorney, Agent, or Firm* — Lerner, David, Littenberg, Krumholz & Mentlik, LLP

(57) ABSTRACT

A transmitting device of present invention includes a framing portion that outputs a video image signal which is acquired per frame after extracting data of the video image signal at every predetermined number of lines in a vertical direction within a frame and positioning the data in a different area within the same frame, and an encoder that encodes an output from the framing portion such that the video image signal is transmitted to a receiving device, when the framing portion is compatible with a progressive image, the framing portion produces the output after swapping the data positioned in the different area between two consecutive frames, and when the framing portion is compatible with an interlaced image, the framing portion produces the output without performing the swapping.

13 Claims, 20 Drawing Sheets

FIG.2
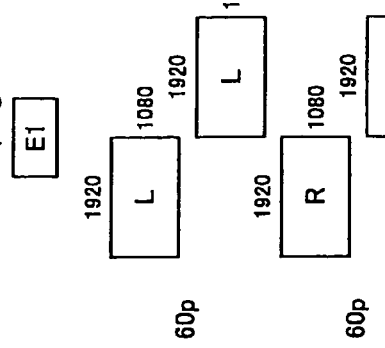
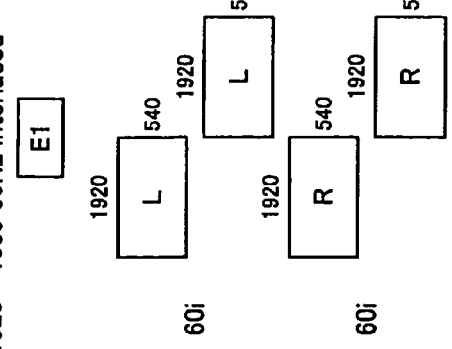

FIG.5

| C0 | C1 | C2 | C3 | | C0' | C2' |
|----|----|----|----|---|-----|-----|
| x  | x  | x  | x  |   | x   | x   |
| o  |    | o  |    |   | o   |     |
| x  | x  | x  | x  |   | x   | x   |
|    |    |    |    |   |     |     |
| x  | x  | x  | x  |   | x   | x   |
| o  |    | o  |    | ⇒ | o   |     |
| x  | x  | x  | x  |   | x   | x   |
|    |    |    |    |   |     |     |
| x  | x  | x  | x  |   | x   | x   |
| o  |    | o  |    |   | o   |     |
| x  | x  | x  | x  |   | x   | x   |
|    |    |    |    |   |     |     |
| x  | x  | x  | x  |   | x   | x   |
| o  |    | o  |    |   | o   |     |
| x  | x  | x  | x  |   | x   | x   |

```
Scalable Frame index ( payloadSize) {
    progressive_frame_flag                      1 bit
    if(progressive_frame_flag)
        1st_frame_indicator                     1 bit
        alternative_frame_pair_indicator        1 bit
}
```

- Progressive_Frame_flag  "1" specifies the data is organized as progressive frame.
  "0" specifies the data is organized as interlaced frame.

- 1st_frame_indicator  "1" specifies the current frame is the 1st frame in Frame-pair.

- Alternative_frame_pair_indicator  "1" specifies the alternative frame is next frame in display order. "0" specifies the alternative frame is previous frame in display order.

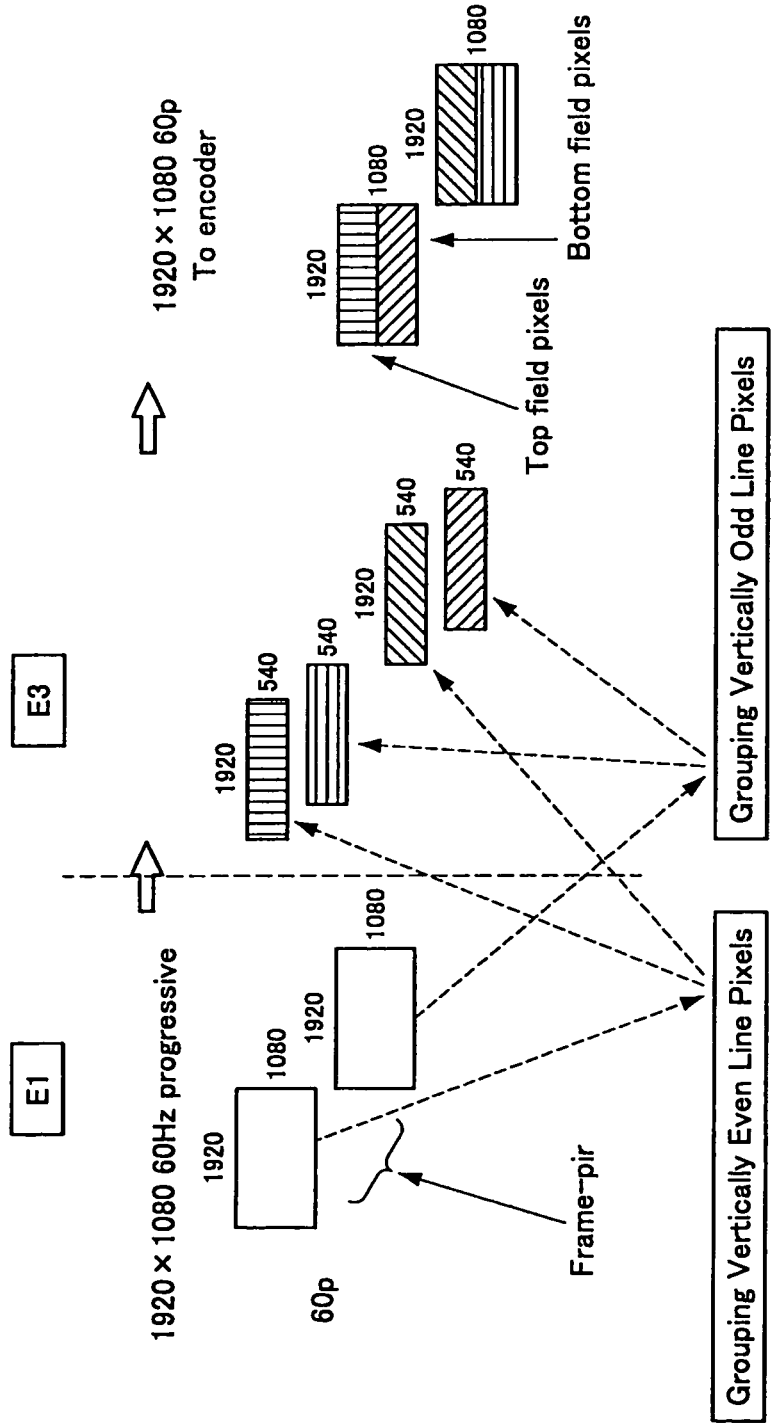

TRANSMITTING DEVICE, RECEIVING DEVICE, COMMUNICATION SYSTEM AND PROGRAM

CROSS-REFERENCE TO RELATED APPLICATION

The present application claims priority from Japanese Patent Application No. JP 2009-224013 filed in the Japanese Patent Office on September 29, 2009, the entire content of which is incorporated herein by reference.

BACKGROUND OF THE INVENTION

1. Field of the Invention

The present invention relates to a transmitting device, a receiving device, a communication system and a program.

2. Description of the Related Art

In recent times, a video image signal using an interlaced image has been widely used as a signal for displaying video image. On the other hand, a video image signal using a progressive image, which can increase an amount of information more than the interlaced image, has been gradually introduced.

Further, an observation method is known in which an image for a left eye and an image for a right eye having parallax therebetween are alternately supplied to a display at a predetermined interval, and the images are viewed using glasses with liquid crystal shutters that are driven in synchronization with the predetermined interval. The method is described in, for example, Japanese Patent Application Publication No. JP-A-9-138384, Japanese Patent Application Publication No. JP-A-2000-36969 and Japanese Patent Application Publication No. JP-A-2003-45343.

SUMMARY OF THE INVENTION

However, when a video image signal using an interlaced image or a progressive image is transmitted from a transmitting device side, if a receiving device side is not provided with a function to decode the interlaced image or the progressive image, a problem arises in which appropriate reception cannot be achieved.

In light of the foregoing, it is desirable to provide a novel and improved transmitting device, receiving device, communication system and program capable of reliably securing compatibility between an interlaced image and a progressive image.

According to an embodiment of the present invention, there is provided a transmitting device including a framing portion that outputs a video image signal which is acquired per frame, has data extracted at every predetermined numbers of lines in a vertical direction and positions the data in a different area in the same frame at every predetermined, and an encoder that encodes an output from the framing portion such that the video image signal is transmitted to a receiving device, when the framing portion is compatible with a progressive image, the framing portion produces the output after swapping the data positioned in the different area between two consecutive frames, and when the framing portion is compatible with an interlaced image, the framing portion produces the output without performing the swapping.

In this configuration, the video image signal is a signal of one of a left eye video image and a right eye video image that form a three-dimensional image.

In this configuration, after extracting the data at every predetermined number of lines and positioning the data in the different area within the same frame, the framing portion merges the left eye video image data and the right eye video image data that correspond to each other chronologically and outputs the merged data as one frame.

In this configuration, when the framing portion is compatible with the progressive image, the framing portion produces the output after extracting data on every other line in the vertical direction and positioning the data in the different area.

In this configuration, when the framing portion is compatible with the interlaced image, the framing portion produces the output after extracting one set of data and positioning the set of data in the different area, the set of data consisting of two lines of data in the vertical direction.

In this configuration, the transmitting device further includes a scaler that operates at a previous stage of the framing portion, the scaler subsampling the video image signal in a horizontal direction.

In this configuration, the transmitting device further includes an area specifying portion that inserts information specifying a chosen area within the frame with respect to data of the frame in which the left eye video image data and the right eye video image data are merged.

According to another embodiment of the present invention, there is provided a receiving device including a decoder that decodes a video image signal that is transmitted by a transmitting device and is acquired per frame, and a framing portion that produces an output after inserting data of a second area with respect to data of a first area within the same frame at every predetermined number of lines. In this configuration, when the framing portion is compatible with a progressive image, the framing portion inserts the data of the second area with respect to the data of the first area within the same frame at every predetermined number of lines after swapping the data positioned in the second area within the frame between two consecutive frames, and when the framing portion is compatible with an interlaced image, the framing portion outputs the data positioned in the first area within the frame as data of a current frame, and outputs the data positioned in the second area as data of a next frame.

In this configuration, the video image signal that is acquired per frame is a video image signal in which a left eye video image and a right eye video image are positioned in a predetermined area within each frame, the left eye video image and the right eye video image forming a three-dimensional image, and the framing portion separates the left eye video image and the right eye video image with respect to each of the frames, and inserts the data of the second area with respect to the data the first area within the same frame at every predetermined number of lines.

In this configuration, the receiving device further includes a scaler that operates at a subsequent stage of the framing portion, the scaler subsampling the video image signal in a horizontal direction.

In this configuration, when the framing portion is compatible with the progressive image, the framing portion inserts every a line of data of the first area between every line of the data of the second area.

In this configuration, when the framing portion is compatible with the interlaced image, the framing portion inserts two lines of data of the first area between every two lines of data of the second area.

According to another embodiment of the present invention, there is provided a communication system including a transmitting device and a receiving device. The transmitting device includes a first framing portion that outputs a video image signal which is acquired per frame, has data extracted at every predetermined numbers of lines in a vertical direction and positions the data in a different area in the same frame at every predetermined, and an encoder that encodes an output from the first framing portion such that the video image signal is transmitted to a receiving device, and when the first framing portion is compatible with a progressive image, the first framing portion produces the output after swapping the data positioned in the different area between two consecutive frames, and when the first framing portion is compatible with an interlaced image, the first framing portion produces the output without performing the swapping. The receiving device includes a decoder that decodes the video image signal that is transmitted by the transmitting device and is acquired per frame, and a second framing portion that produces an output after inserting data of a second area with respect to data of a first area within the same frame at every predetermined number of lines, and when the second framing portion is compatible with a progressive image, the second framing portion inserts the data of the second area with respect to the data of the first area within the same frame at every predetermined number of lines after swapping the data positioned in the second area between two consecutive frames, and when the second framing portion is compatible with an interlaced image, the second framing portion outputs the data positioned in the first area within the frame as data of a current frame, and outputs the data positioned in the second area as data of a next frame.

According to another embodiment of the present invention, there is provided a program that includes instructions that command a computer to function as an outputting device that outputs a video image signal which has data extracted at every predetermined numbers of lines in a vertical direction and positions the data in a different area in the same frame at every predetermined, when the outputting device is compatible with a progressive image, the outputting device produces the output after swapping the data positioned in the different area between two consecutive frames, and when the outputting device is compatible with an interlaced image, the outputting device produces the output without performing the swapping; and an encoding device that encodes an output from the outputting device such that the video image signal is transmitted to a receiving device.

According to another embodiment of the present invention, there is provided a program that includes instructions that command a computer to function as a decoding device that decodes a video image signal that is transmitted by a transmitting device and is acquired per frame; and an outputting device that produces an output after inserting data of a second area with respect to data of a first area within the same frame at every predetermined number of lines, wherein, when the outputting device is compatible with a progressive image, the outputting device inserts the data of the second area with respect to the data of the first area within the same frame at every predetermined number of lines after swapping the data positioned in the second area within the frame between two consecutive frames, and wherein, when the outputting device is compatible with an interlaced image, the outputting device outputs the data positioned in the first area within the frame as data of a current frame, and outputs the data positioned in the second area as data of a next frame.

According to the embodiments of the present invention, it becomes possible to reliably secure the compatibility between the interlaced image and the progressive image.

BRIEF DESCRIPTION OF THE DRAWINGS

FIG. 2 is a diagram schematically showing a configuration of video image data at each of stages of the transmitting device;

FIG. 5 is a schematic diagram illustrating subsampling shown in FIG. 3 and FIG. 4;

FIG. 6 is a schematic diagram showing a sampling structure under a 4:2:0 arrangement in the progressive and interlaced cases;

FIG. 15 is a schematic diagram showing a signaling syntax of 60p/60i scalability;

FIG. 16 is a schematic diagram showing a case in which a two dimensional (2D) video image signal is processed on a transmitting device side;

DETAILED DESCRIPTION OF THE EMBODIMENT(S)

Figure 1:
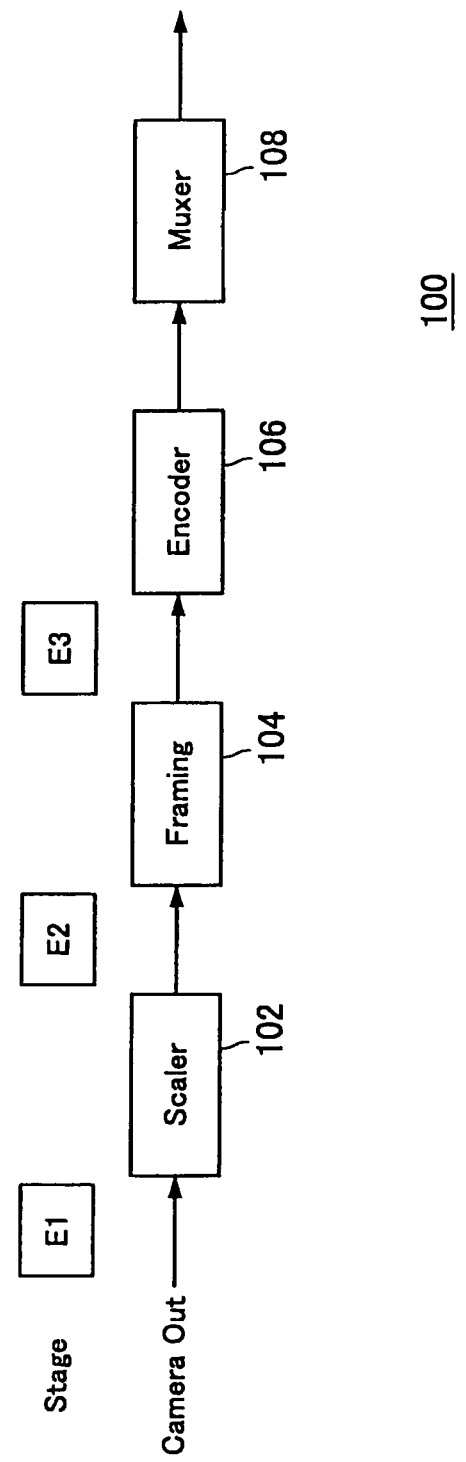
FIG. 1 is a schematic diagram showing a configuration example of a transmitting device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that explanations will be provided below in the following order:

1. First embodiment (securing compatibility between an interlaced image and a progressive image)

2. Second embodiment (specifying an area of video image data)

1. First Embodiment

First, with reference to the drawings, a transmitting device 100 according to a first embodiment of the present invention will be explained. FIG. 1 is a schematic diagram illustrating a configuration example of the transmitting device 100. The transmitting device 100 encodes, for example, a three-dimensional image including a left eye image and a right eye image, and transmits the encoded image to a receiving device 200 described below. As shown in FIG. 1, the transmitting device 100 according to the first embodiment includes a scaler 102, a framing portion 104, an encoder 106 and a muxer 108.

FIG. 2 is a diagram schematically showing a configuration of video image data at each of stages of the transmitting device 100. Stages E1 to E3 shown in FIG. 1 respectively correspond to stages E1 to E3 in FIG. 2. In FIG. 2, the stage E1 schematically shows data that are input into the scaler 102. Further, in FIG. 2, the stage E2 schematically shows data that are output from the scaler 102 and input into the framing portion 104. In addition, the stage E3 schematically shows data that are output from the framing portion 104 and input into the encoder 106.

In the transmitting device 100 according to the present embodiment, different processing is performed for a progressive image and an interlaced image. In a case of the progressive image, each frame is respectively grouped into horizontal even line groups and horizontal odd line groups, with one horizontal line being regarded as a unit. The odd line group is swapped between a 1st frame and a 2nd frame that form a frame-pair. In this way, when an interlaced frame is used, all structural elements of the interlaced frame can be included in the 1st frame of the frame-pair.

Data processing in the transmitting device 100 will be explained in detail below. First, with reference to FIG. 2, an overview of the data processing in the transmitting device 100 will be explained. Image data captured by a digital camera etc. (Camera Out) is input into the scaler 102. FIG. 2 shows a case in which the video image data is progressive and a case in which the video image data is interlaced respectively. The case in which the video image data is progressive is shown in an upper half of FIG. 2 and the case in which the video image data is interlaced is shown in a bottom half of FIG. 2.

First, starting with an explanation of the progressive case, the upper half of FIG. 2 shows an example of a case in which a frequency is 60 Hz (60p), and as an output from a camera, a left eye video image L and a right eye video image R are input into the scaler 102 per frame. Here, the left eye video image L and the right eye video image R are respectively a 1920×1080 pixel (picture element) video image, and the video images are input into the scaler 102 per frame at a frequency of 60 Hz. FIG. 2 shows how a first frame (1st frame) and a second frame (2nd frame) are input into the scaler 102 respectively for the left eye video image L and the right eye video image R.

In the scaler 102, with respect to the left eye video image L and the right eye video image R respectively, data are thinned out in the horizontal direction, and processing for compressing the data in the horizontal direction is performed. Namely, in the scaler 102, subsampling is performed on the image data in the horizontal direction, and processing for halving a horizontal resolution is performed. The data compressed in the horizontal direction is input into the framing portion 104. In the framing portion 104, with respect to data arranged in the vertical direction, processing for extracting every other line of the data and positioning the data to the side is performed. This processing will be explained below with reference to FIG. 3.

Figure 3:
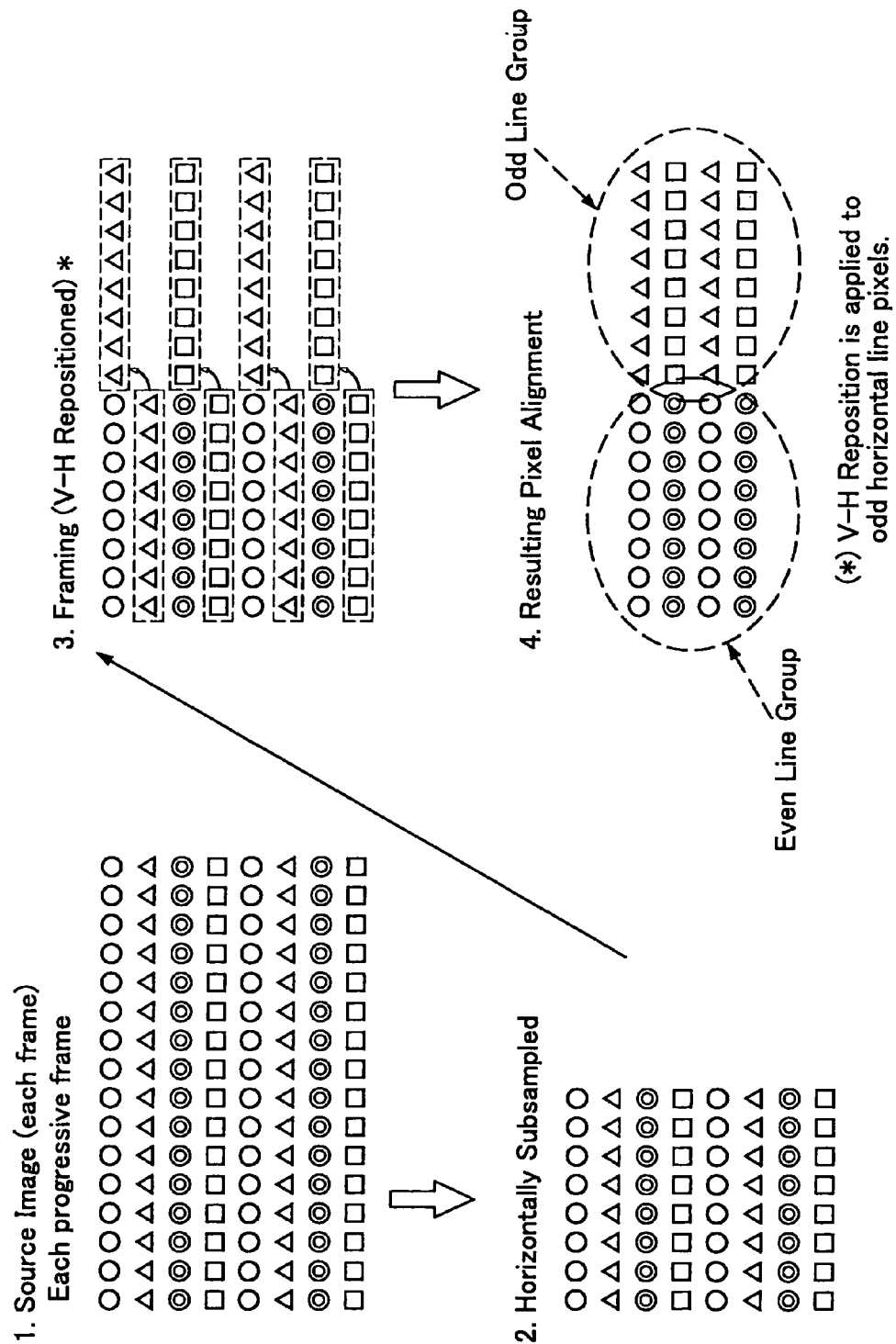
FIG. 3 is a schematic diagram showing processing that is performed in a scaler and a framing portion in a progressive case.

FIG. 3 is a schematic diagram showing processing performed in the scaler 102 and the framing portion 104 in the progressive case, namely, when a progressive frame is encoded. In FIG. 3, symbols such as ○, △, ⊚, □ etc. schematically show individual pixel data. A source image (1. Source Image) shown in FIG. 3 shows the left eye video image L and the right eye video image R located at a leftmost position in an upper half of FIG. 1 respectively, and the source data is source image data provided by a camera output (Camera Out). The source image is subsampled in the horizontal direction at the scaler 102, and the source image becomes data shown under "2. Horizontally Subsampled" in FIG. 3. In the subsampling, as shown in FIG. 3, the data are thinned out on every other pixel in the horizontal direction, and the horizontal resolution is halved. Therefore, in the embodiment, at a time of three-dimensional (3D) transmission, a resolution in the vertical direction can be maintained at a high resolution of the source image level.

Framing is performed on the subsampled data in the framing portion 104, and every other line of the data in the vertical direction is moved to a right-hand side area within a space. "3. Framing (V-H Repositioned)" in FIG. 3 shows processing performed by the framing portion 104. In the framing portion 104, assuming that lines in the vertical direction are numbered from a top line starting from 0, 1, 2 . . . , data in odd-numbered lines (0 is included in odd numbers) are extracted, and the pixels are moved to the right-hand side area within the space. After that, the data are moved in the upward direction such that any space between the lines in the vertical direction is eliminated. In this way, data shown under "4. Resulting Pixel Alignment" in FIG. 3 are acquired.

Since the data shown under "2. Horizontally Subsampled" in FIG. 3 are subsampled in the horizontal direction with respect to originally 1920×1080 pixel data, the data correspond to 960×1080 pixel data shown in the stage E2 in the upper half of FIG. 2. Further, data shown under "4. Resulting Pixel Alignment" in FIG. 3 are acquired as a result of moving every other line of the data in the vertical direction to the right-hand side area within the space with respect to the data shown under "2. Horizontally Subsampled". Therefore, the data are 1920×540 pixel data, and they correspond to 1920×540 pixel data shown in the stage E2 in the upper half of FIG. 2.

After that, with respect to the 1920×540 pixel data, data of the left eye video image L and the right eye video image R are merged in the framing portion 104. As shown in the upper half of FIG. 2, the merged data becomes 1920×1080 pixel data, and then they are input into the encoder 106. In the encoder 106, encoding is performed on the 1920×1080 pixel data that are input thereinto.

As described above, in the case of the progressive image, two frames of data respectively for the left eye video image L and the right eye video image R (four frames in total) are processed in the scaler 102 and the framing portion 104. Then, the data of the left eye video image L and the right eye video image R are merged, and the data are sent to the encoder 106 as two frames of the 1920×1080 pixel data. In the case of the progressive image, by reading out the even line group and the odd line group shown in FIG. 3 alternately, it is possible to handle the image as an interlace field.

Next, an interlaced case will be explained. A case in which a frequency is 60 Hz (60i) is shown as an example in the bottom half of FIG. 2. As the output from the camera, the left eye video image L and the right eye video image R are input into the scaler 102 per frame. Here, the left eye video image L and the right eye video image R are respectively 1920×540 pixel video images, and the video images are input into the scaler 102 per frame at the frequency of 60 Hz. In the interlaced case, one of the left eye video images L (or right eye video images R) is formed with two consecutive frames. FIG. 2 shows how a first frame (top frame) and a second frame (bottom frame) are input into the scaler 102 respectively for the left eye video image L and the right eye video image R.

In the scaler 102, in a similar manner to the progressive case, with respect to the left eye video image L and the right eye video image R respectively, data are thinned out on every other row in the horizontal direction, and the processing for compressing the data in the horizontal direction is performed. The horizontally thinned out data are input into the framing portion 104. In the framing portion 104, with respect to the image data arranged in the vertical direction, processing is performed to extract two lines of the data every other two lines and position the data to the side.

Figure 4:
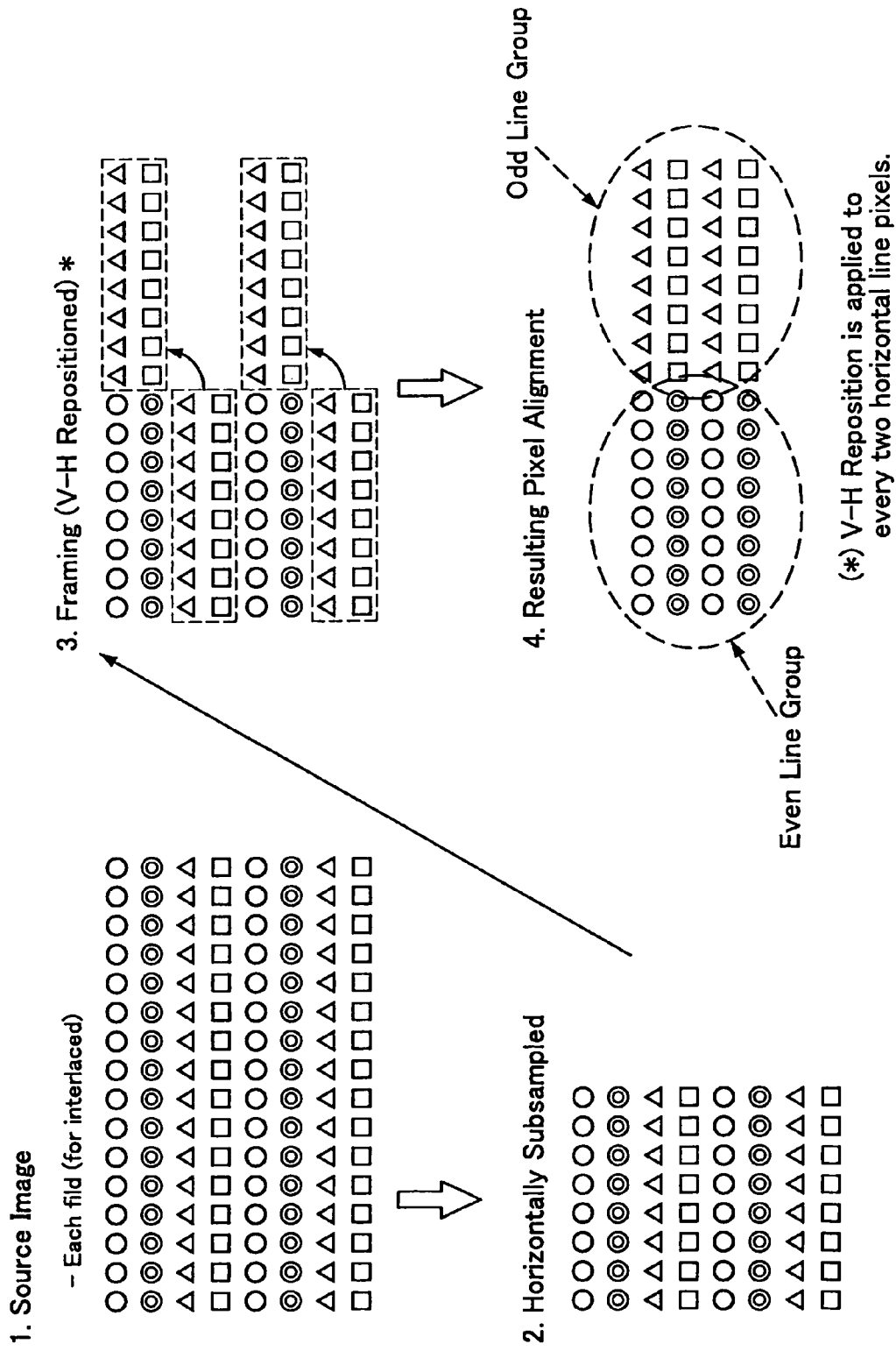
FIG. 4 is a schematic diagram showing processing that is performed in the scaler and the framing portion in an interlaced case.

FIG. 4 is a schematic diagram showing processing performed in the scaler 102 and the framing portion 104 in the interlaced case, namely, when the interlaced frame is encoded. In FIG. 4, symbols such as ○, △, ⊚, □ etc. schematically show the individual pixel data. In a similar manner to that shown in FIG. 3, a source image (1. Source Image) shown in FIG. 4 shows the left eye video image L and the right eye video image R located at the leftmost position in the upper half of FIG. 1 respectively, and the source data are source image data provided by the camera output (Camera Out). The source image is subsampled in the horizontal direction at the scaler 102. Then, the source image is thinned out on every other row and becomes data shown under "2. Horizontally Subsampled" in FIG. 4. In the subsampling, as shown in FIG. 4, the data are thinned out on every other pixel in the horizontal direction, and the horizontal resolution is halved.

Framing is performed on the subsampled data in the framing portion 104, and two lines of data every other two lines in the vertical direction are moved to the right-hand side area within the space. "3. Framing (V-H Repositioned)" in FIG. 4 shows processing performed by the framing portion 104. In the framing portion 104, assuming that lines in the vertical direction are numbered from a top line starting from 0, 1, 2 . . . , data in the lines numbered 2, 3, 6, 7, 10, 11 . . . (two lines of data every other two lines) are extracted and moved to the right-hand side area within the space. After that, each line of the data is moved in the upward direction such that any space between the lines in the vertical direction is eliminated. In this way, data shown under "4. Resulting Pixel Alignment" in FIG. 4 are acquired.

Since the data shown under "2. Horizontally Subsampled" in FIG. 4 are subsampled in the horizontal direction with respect to originally 1920×540 pixel data, the data correspond to 960×540 pixel data shown in the stage E2 in the bottom half of FIG. 2. Further, the data shown under "4. Resulting Pixel Alignment" in FIG. 4 are acquired as a result of further moving two lines of the data every other two lines in the vertical direction to the right-hand side area within the space with respect to the data shown under "2. Horizontally Subsampled". Therefore, the data are 1920×270 pixel data, and they correspond to 1920×270 pixel data shown in the stage E2 in the bottom half of FIG. 2.

After that, with respect to the 1920×270 pixel data, data of the left eye video image L and the right eye video image R are merged in the framing portion 104. The merged data become 1920×540 pixel data, and then they are input into the encoder 106. In the encoder 106, encoding is performed on the 1920× 540 pixel data that are input thereinto.

As described above, in a case of the interlaced image, with respect to the left eye video image L and the right eye video image R respectively, data forming one frame (the top frame and the bottom frame) are processed in the scaler 102 and the framing portion 104. Then, the data of the left eye video image L and the right eye video image R are merged, and the data are sent to the encoder 106 as two frames of the 1920× 540 pixel data.

In this way, according to the present embodiment, in the progressive case, under the processing in the framing portion 104, the odd-numbered lines are extracted and positioned to the side of the even-numbered lines. On the other hand, in the interlaced case, one set of lines is extracted from the top end in the vertical direction and positioned in the right-hand side area within the space, the one set of lines being formed by two lines. In this way, it is possible to increase a degree of correlation between pixels adjacent to each other compared with a case in which the left eye image and the right eye image are arranged using, for example, an approach (such as a Checker Board approach) in which the left eye image and the right eye image are mixed at a pixel level. In addition, since it is possible to secure a high degree of correlation even when the left eye video image and the right eye video image have parallax therebetween, it is possible to significantly improve compression encoding efficiency. Further, since processing for thinning out the data is performed only in the horizontal direction, a color-difference signal line can be kept in the data. Thus, it is possible to minimize degradation of an image quality.

With reference to FIG. 5 to FIG. 9, processing in the scaler 102 and the framing portion 104 and particularly a reason why the processing in the framing portion 104 is different for the progressive case and the interlaced case will be explained below. First, with reference to FIG. 5, the subsampling in FIG. 3 and FIG. 4 will be explained. FIG. 5 is a schematic diagram showing the subsampling in the horizontal direction by the scaler 102. FIG. 5 shows a 4:2:0 arrangement, and shows a state in which a pixel that indicates a luminance (indicated as x in FIG. 5) and a signal that indicates a color difference (indicated as ○ in FIG. 5) are arranged. As shown in FIG. 5, under the 4:2:0 arrangement, the color-difference signal (○) is arranged in every other line of the luminance, and the number of the color-difference signal (○) is two with respect to four luminances (x). As shown in FIG. 5, after the rows of data C1 and C3 are thinned out by the subsampling, four rows of data in the horizontal direction (C0, C1, C2 and C3) are turned into two rows of data of C0' and C2'.

Figure 6:
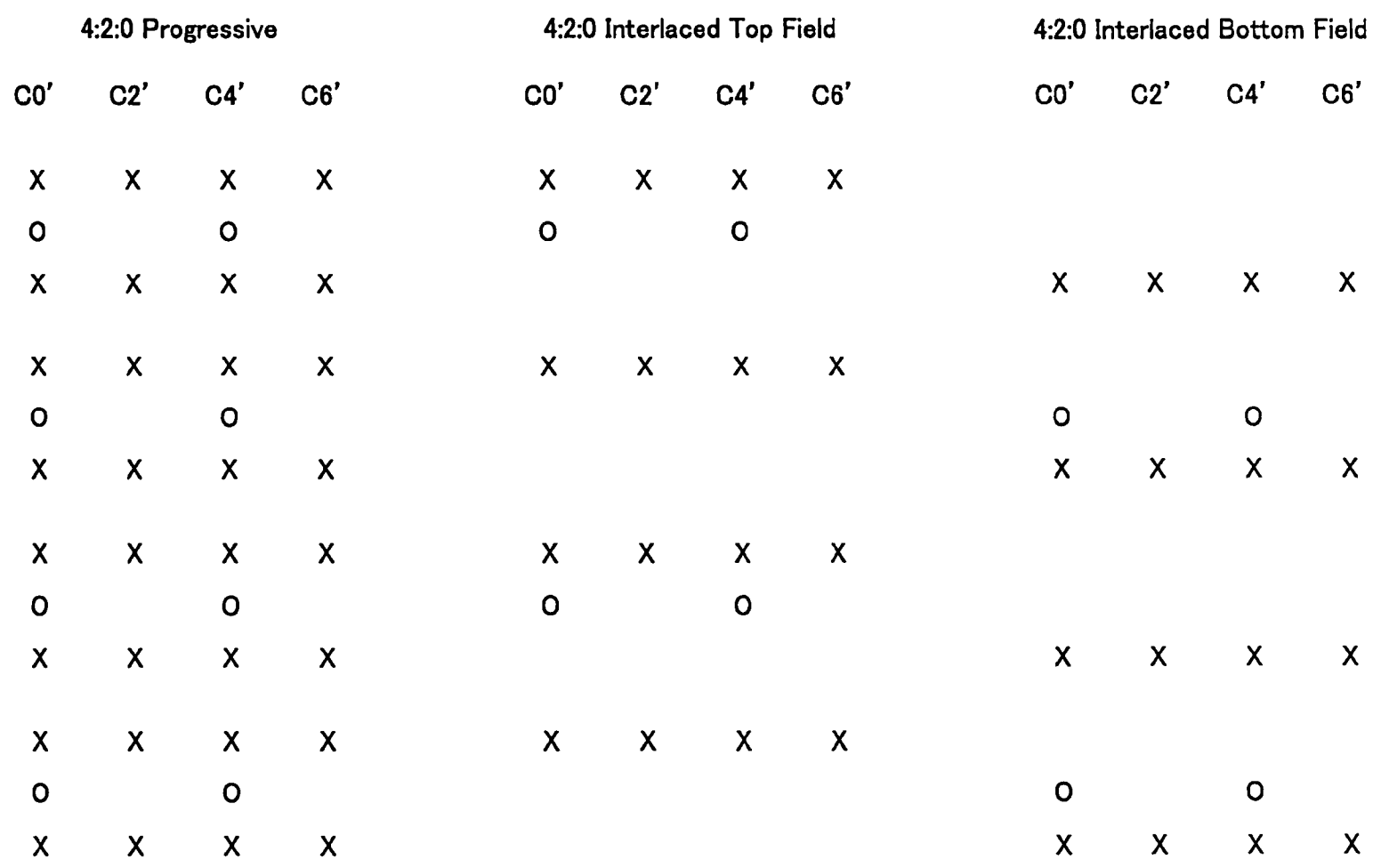

Further, FIG. 6 is a schematic diagram showing a sampling structure under the 4:2:0 arrangement in the progressive case and the interlaced case. In FIG. 6, the progressive case is shown in the left-hand side, an interlaced top field is shown in the center, and an interlaced bottom field is shown in the right-hand side.

The progressive data shown in the left-hand side of FIG. 6 form one frame of video image data on their own. On the other hand, the interlaced data shown in the center and on the right-hand side of FIG. 6 form one frame of video image data with two pieces of data, namely, the top field and the bottom field data.

As shown in FIG. 6, with respect to a progressive data arrangement, in the interlaced top field, data of the luminance x from odd-numbered lines of the progressive data are arranged. In the bottom field, data of the luminance x from even-numbered lines of the progressive data are arranged. Further, in the progressive case, the color-difference signal (○) is added to the data of the luminance x on every other line. However, in the interlaced case, when looking at the data in the vertical direction, the color-difference signal (○) is added to the data of the luminance x on every other line in the top field and the bottom field respectively, the color-difference signal (○) being added to the top field and the bottom field alternately. Further, in the top field, the color-difference signal (○) is added below the luminance x in the vertical direction, and in the bottom field, the color-difference signal (○) is added above the luminance x in the vertical direction.

Figure 7:
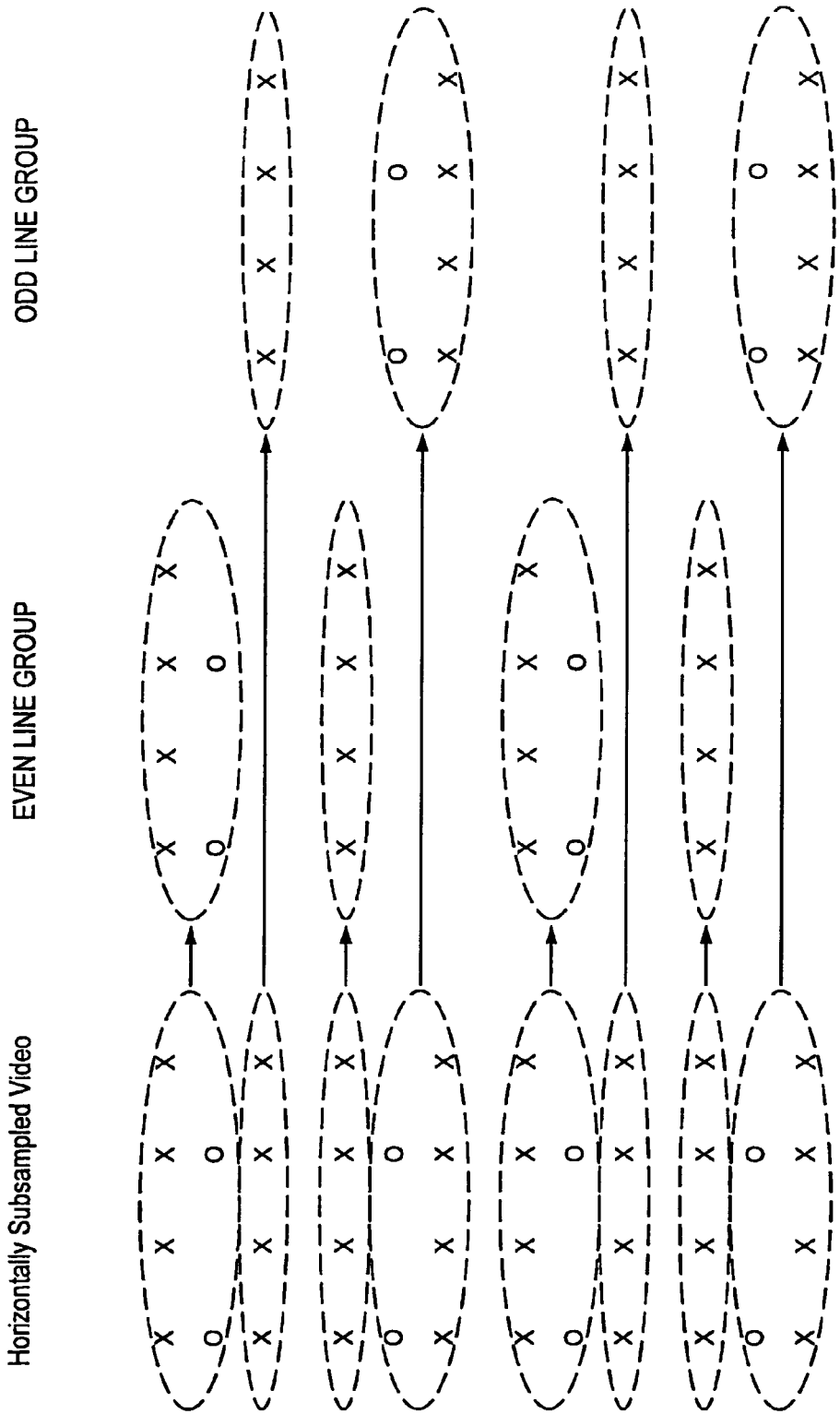
FIG. 7 is a schematic diagram showing processing performed in the framing portion in the progressive case.

FIG. 7 is a schematic diagram showing processing performed in the framing portion 104 in the progressive case. FIG. 7 corresponds to processing shown in the upper half of FIG. 2 and FIG. 3. As illustrated in FIG. 2 and FIG. 3, in the progressive case, the odd-numbered lines are extracted and positioned to the side of the even-numbered lines without moving the even-numbered lines.

Figure 8:
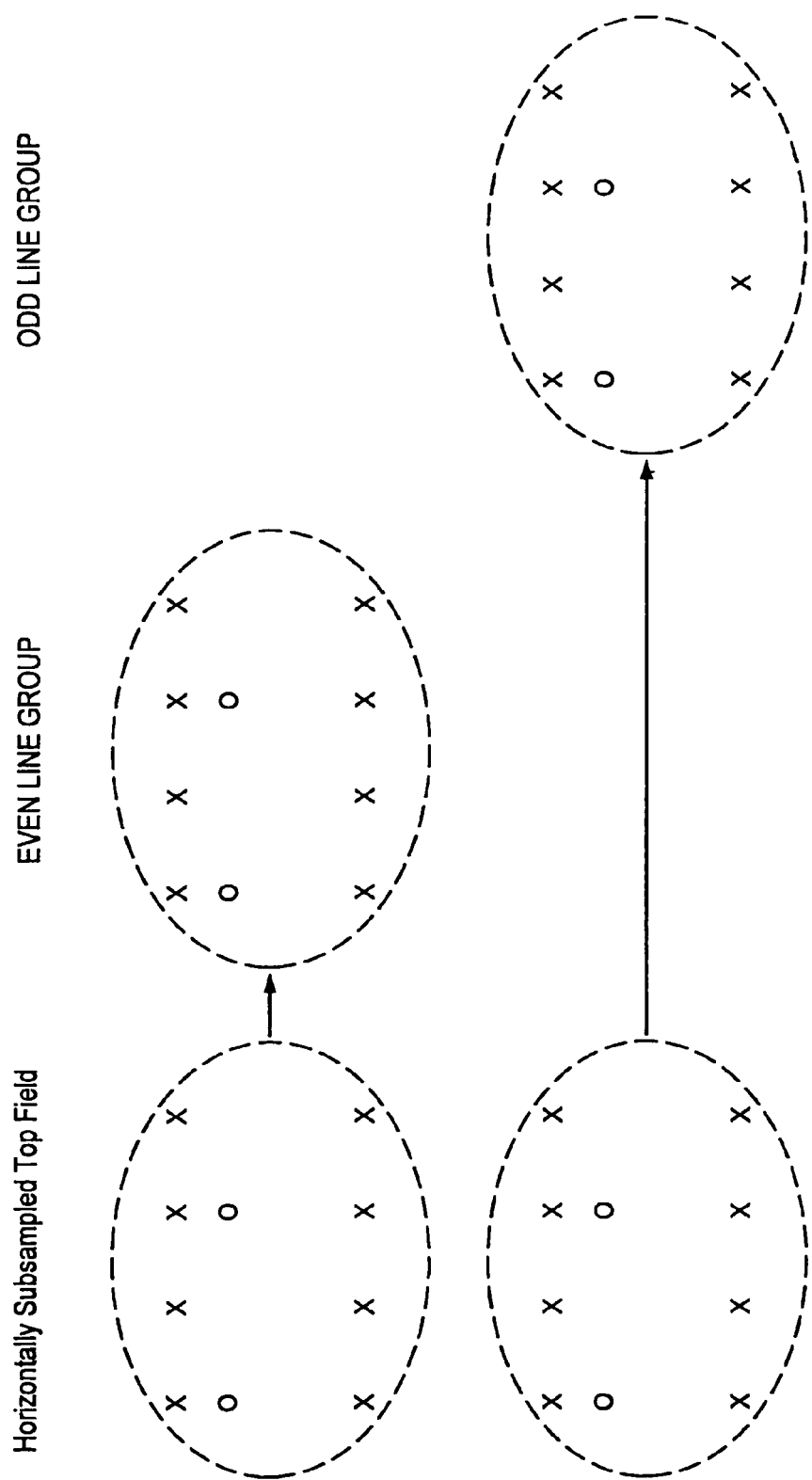
FIG. 8 is a schematic diagram showing processing performed in the framing portion in the interlaced case.
Figure 9:
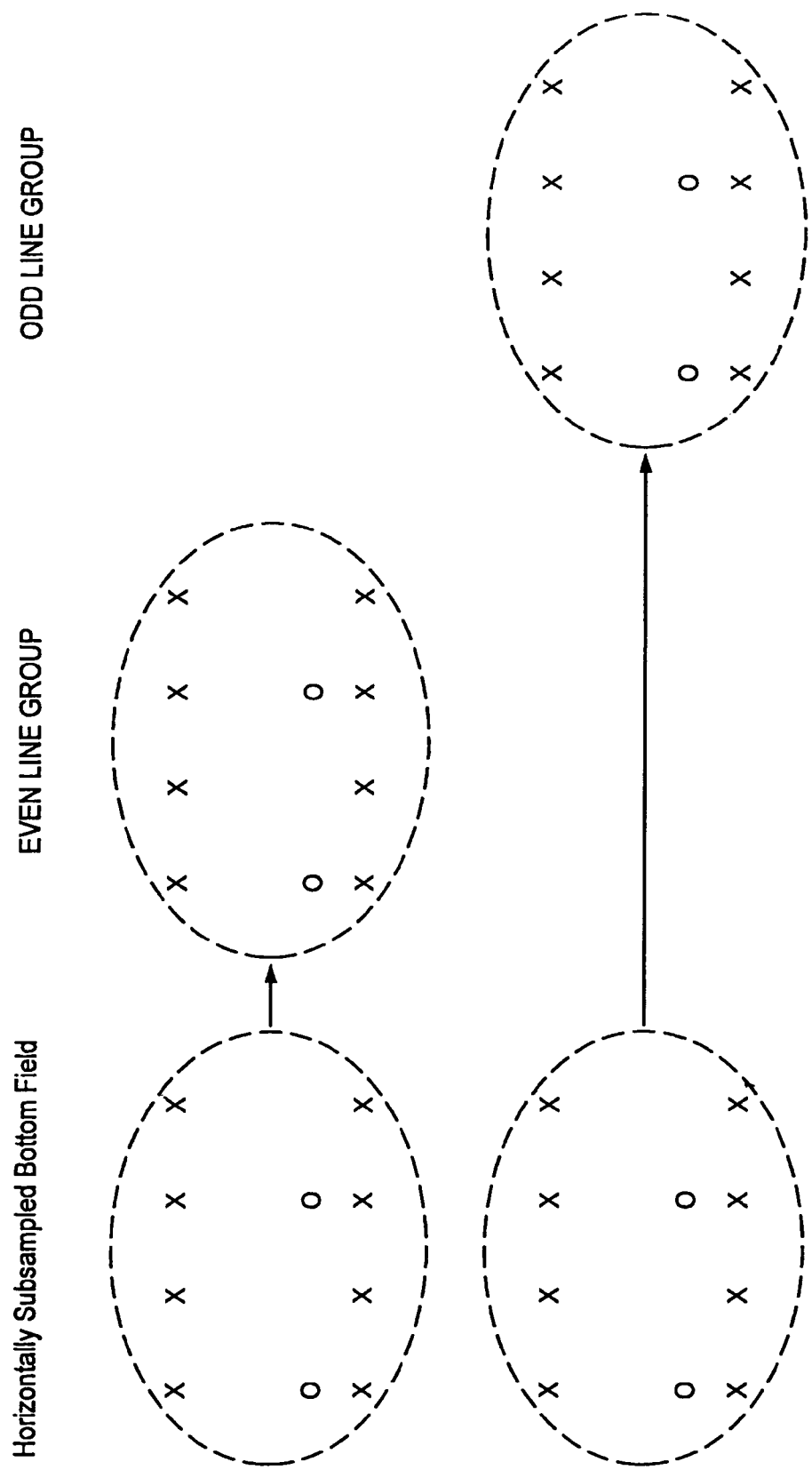
FIG. 9 is a schematic diagram showing the processing performed in the framing portion in the interlaced case.

FIG. 8 and FIG. 9 are schematic diagrams showing processing performed in the framing portion 104 in the interlaced case. FIG. 8 and FIG. 9 correspond to processing in the bottom half of FIG. 2 and FIG. 4. Here, FIG. 8 is a schematic diagram showing processing performed on the interlaced top field in the framing portion 104. In a similar manner, FIG. 9 is a schematic diagram showing processing performed on the interlaced bottom field in the framing portion 104. As illustrated in the bottom half of FIG. 2 and FIG. 4, in the interlaced case, one set of lines, which is formed with two lines, is moved and positioned to the side, without moving initial two lines in the vertical direction, and similar processing is repeated on subsequent lines arranged in the vertical direction with processing being performed on two lines at a time.

Here, as illustrated in FIG. 6, in the interlaced case, the color-difference signal (○) is alternately added to the top field and the bottom field. Further, with respect to the top field, the color-difference signal (○) is added below the luminance x in the vertical direction, and with respect to the bottom field, the color-difference signal (○) is added above the luminance x in the vertical direction. Thus, if the signal is extracted from every other line in a similar manner to the progressive case, with respect to the top field, there exists no color-difference signal (○) in the odd-numbered lines that are moved to the right-hand side area. Further, if the signal is extracted from every other line, with respect to the bottom field, a case arises in which the color-difference signal (○) only exists on the odd-numbered lines that are moved to the right-hand side area and no color-difference signal (○) exists on the even-numbered lines in the left-hand side area. According to the present embodiment, as shown in FIG. 8 and FIG. 9, in the interlaced case, two lines of the signal are extracted at a time so that the color-difference signal (○) can be distributed both to the right-hand side area to which the signal is moved and to the odd line group or the even line group arranged in the left-hand side area. Then, in accordance with such a configuration, when decoding is performed on the interlaced data in processing on the receiving device 200 side, the processing being described below, it is possible to distribute the color-difference signal (○) to two consecutive frames.

As described above, in accordance with an example in FIG. 2, by performing data processing in the scaler 102 and the framing portion 104, in either case in which the video image signal is progressive (60p) or the video image signal is interlaced (60i), it is possible to convert the signal into two frames of data, in which the left and right video image signals are merged, and to input the data to the encoder 106.

Figure 10:
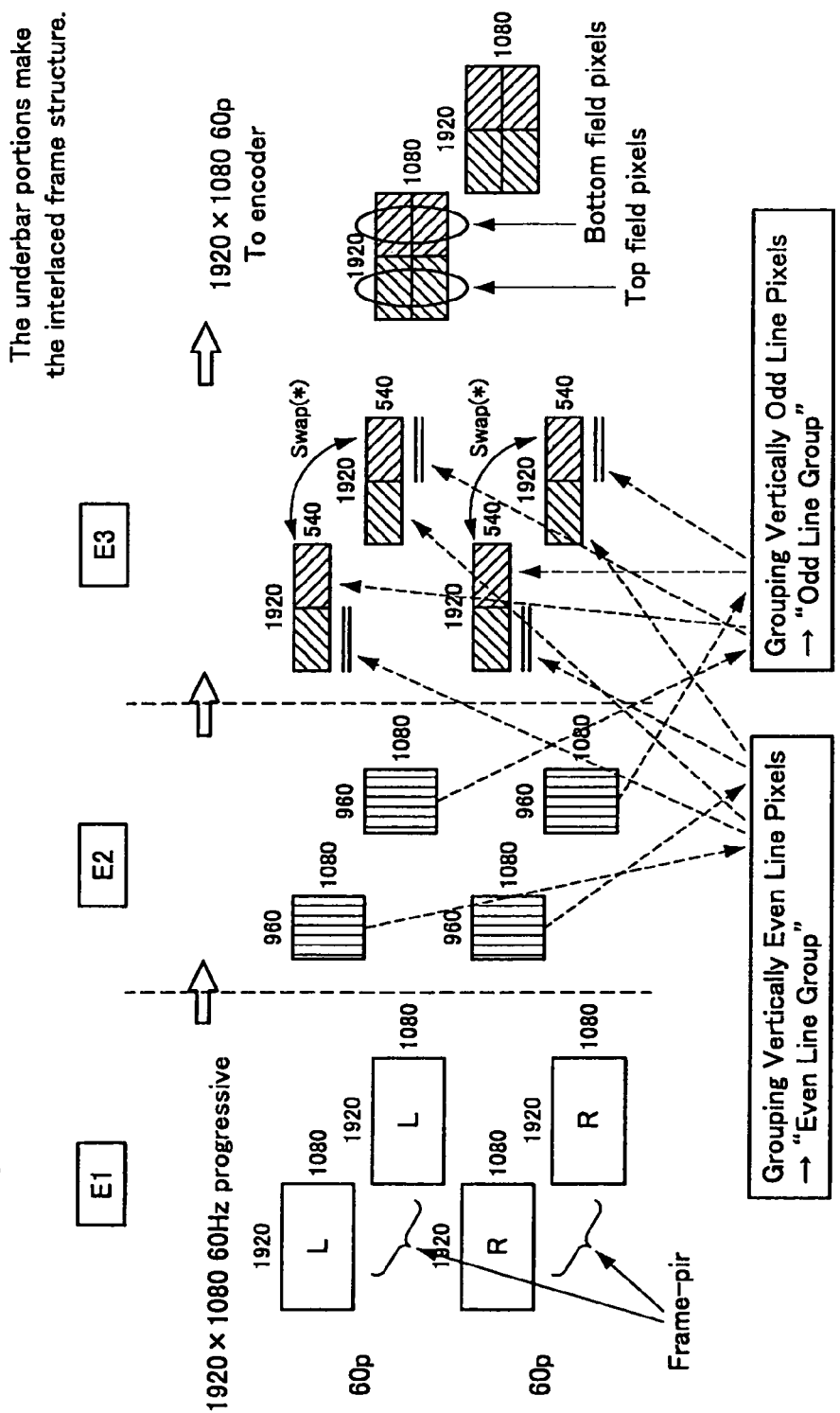
FIG. 10 is a schematic diagram illustrating a method for data swapping.

Next, with reference to FIG. 10, a method for data swapping according to the present embodiment will be explained. FIG. 10 is a schematic diagram showing an example in which the data swapping is performed in the progressive case using the method according to the present embodiment. In FIG. 10, processing up to the stage E2 is substantially the same as the processing shown in the upper half of FIG. 2. In the data swapping shown in FIG. 10, after generating the data illustrated under "3. Framing (V-H Repositioned)" in FIG. 3 and FIG. 4, processing is performed in which a right-half of the generated data is swapped with a right-half of data of a subsequent frame. As shown in FIG. 10, the swapping is performed on the left eye video image L and the right eye video image R respectively.

In more detail, when an input signal is the progressive image, as a result of moving the odd-numbered lines to the right-hand side per frame while regarding one horizontal line as a unit, the data are grouped into the even line group that forms a left-half of the 1920×540 pixel data and the odd line group which forms a right-half of the 1920×540 pixel data. Then, the odd line groups are swapped between the first frame (1st frame) and the second frame (2nd frame), the 1st frame and the 2nd frame forming the frame-pair. In this way, assuming that the interlaced frame is used instead of the progressive frame, all the structural elements of the interlaced frame can be included in the first frame (1st frame) of the progressive frame-pair. Therefore, as described below, when interlaced decoding is performed, both the interlaced top frame and the interlaced bottom frame can be formed only by decoding the 1st frame of the progressive frame-pair.

With respect to the 1920×540 pixel data that are acquired as a result of the data swapping, in a similar manner to the case illustrated in the upper half of FIG. 2, the left eye video image L and the right eye video image R are merged and turned into the 1920×1080 pixel data before being input into the encoder 106. In the encoder 106, with respect to progressive sequence encoding, encoding that satisfies a limitation of the frame-pair is performed.

Figure 11:
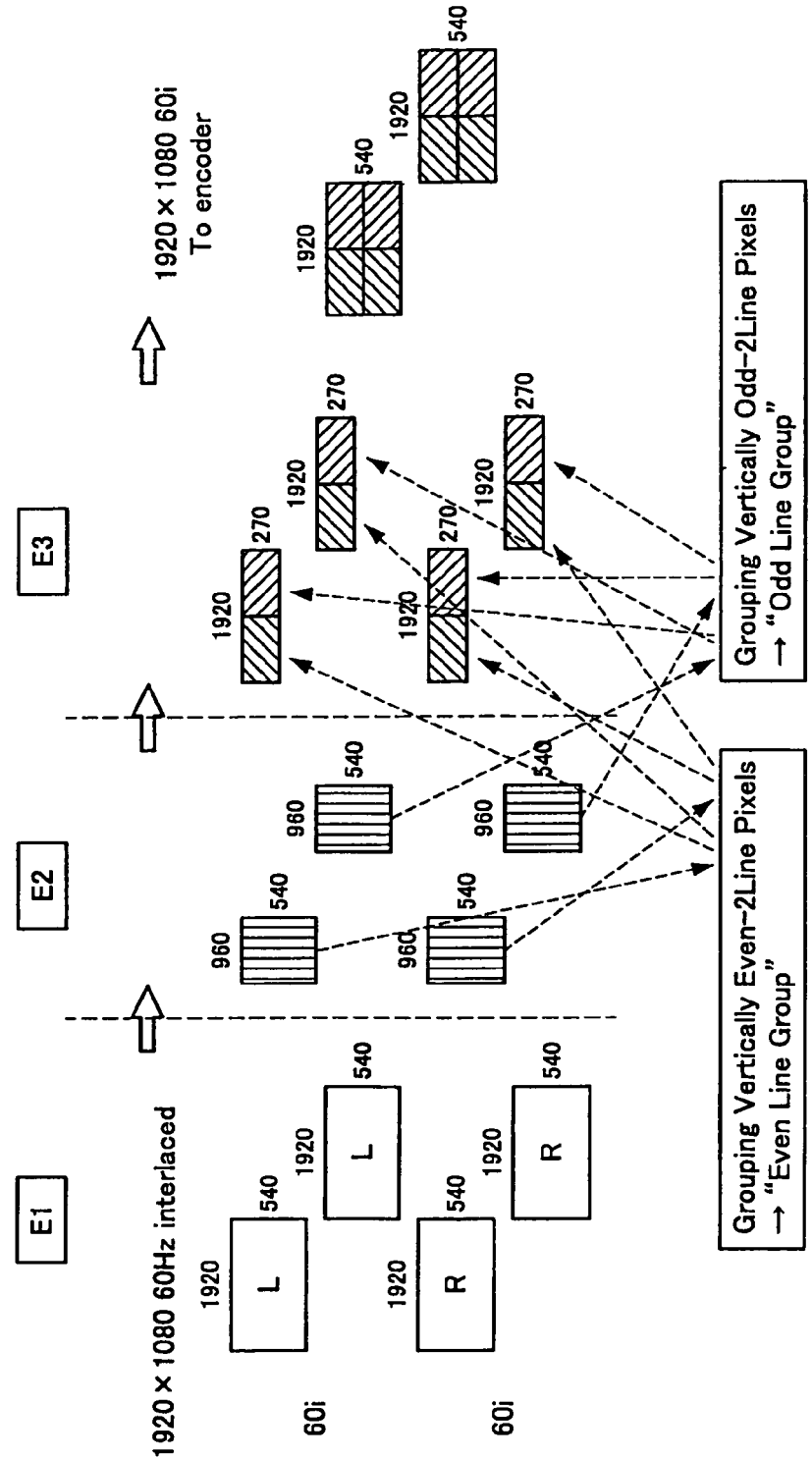
FIG. 11 is a schematic diagram showing processing in the interlaced case.

FIG. 11 shows processing in a case in which the input signal is interlaced, and the processing is substantially the same as the processing illustrated in the bottom half of FIG. 2. As shown in FIG. 11, in the interlaced case, the data swapping is not performed. Therefore, as described in the bottom half of FIG. 2, in the case of the interlaced image, all the pixels including the even-numbered lines (even lines) and the odd-numbered lines (odd lines) are grouped into the even line group and the odd line group per field while regarding two horizontal lines as a unit. Then, in the interlaced case, without performing the data swapping, the 1920×540 pixel data that are output from the framing portion 104 are input to the encoder 106. As described above, when the transmitting device 100 is compatible with the progressive image, the processing shown in FIG. 10 is performed, and when the transmitting device 100 is compatible with the interlaced image, the processing shown in FIG. 11 is performed. Note that when the transmitting device 100 is compatible with the progressive image, the transmitting device 100 can normally handle the interlaced image as well, so it is possible for the transmitting device 100 to perform the processing shown in FIG. 11.

Figure 12:
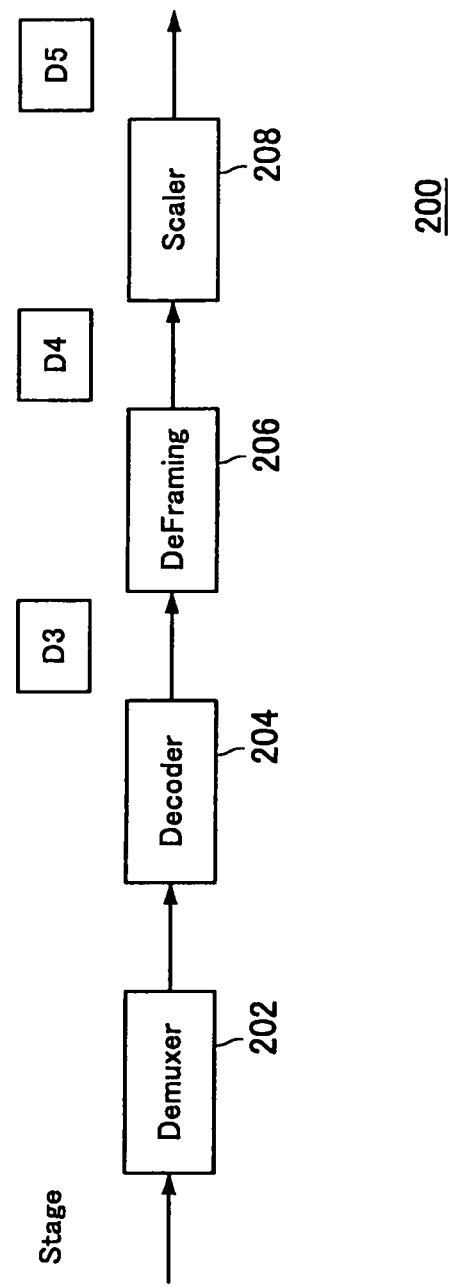
FIG. 12 is a schematic diagram showing a configuration of a receiving device.

Next, a configuration example of the receiving device according to the present embodiment provided with a function to decode the video image signal transmitted from the above-mentioned transmitting device 100 will be explained. FIG. 12 is a schematic diagram showing a configuration of the receiving device 200. As shown in FIG. 12, the receiving device 200 includes a demuxer 202, a decoder 204, a deframing portion 206 and a scaler 208.

Figure 13:
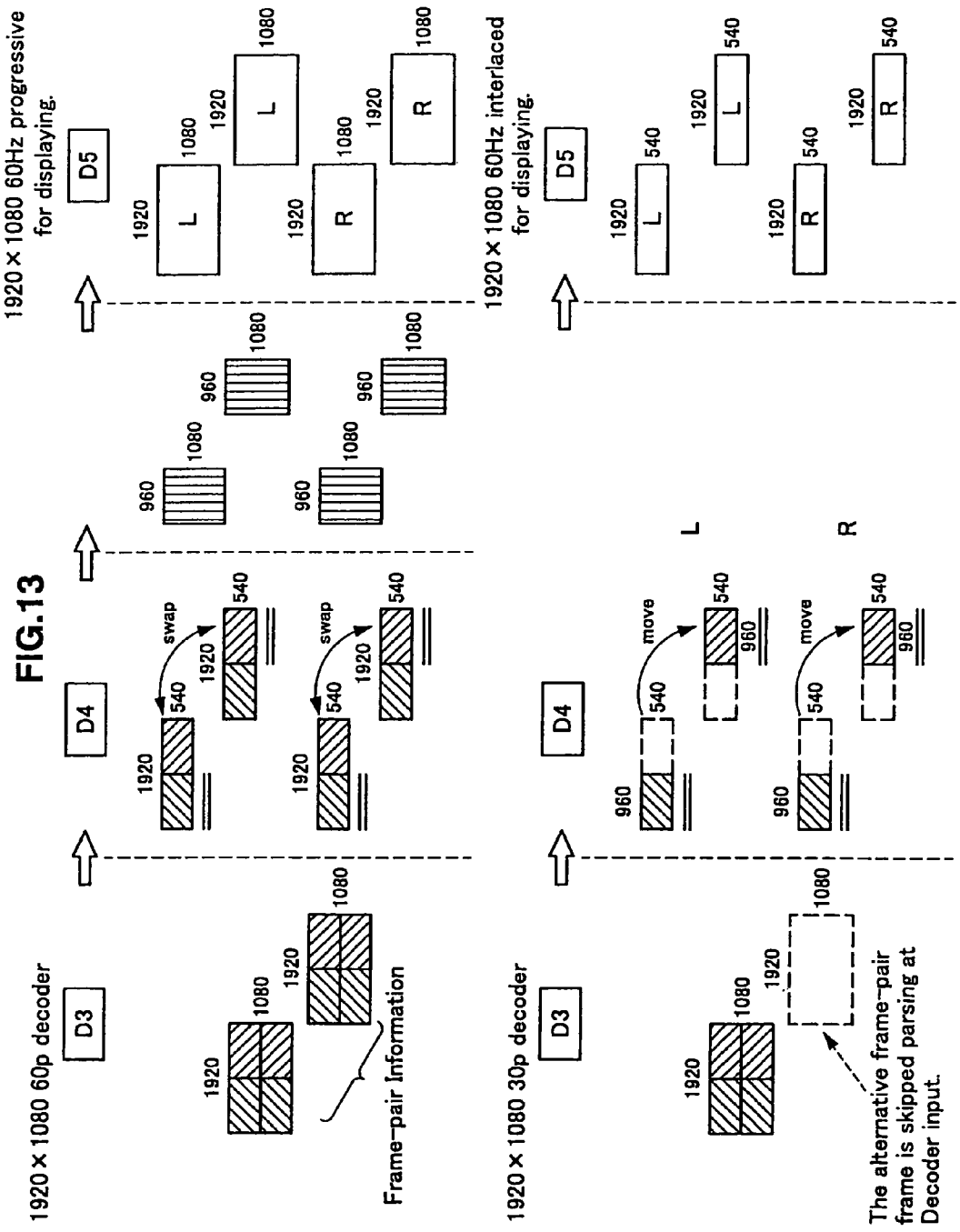
FIG. 13 is a schematic diagram showing a configuration of video image data at each of stages of the receiving device.

Further, FIG. 13 is a schematic diagram schematically showing a configuration of video image data at each stage in the receiving device 200. Stages D1 to D3 shown in FIG. 13 respectively correspond to D1 to D3 shown in FIG. 12. In FIG. 13, stage D3 schematically shows data that are output from the decoder 204 and input into the deframing portion 206. In addition, in FIG. 13, stage D4 schematically shows data that are output from the deframing portion 206 and input into the scaler 208. Further, stage D5 schematically shows data that are output from the scaler 208.

Data processing in the receiving device 200 will be explained below in detail. An upper half of FIG. 13 shows a case in which the video image signal is transmitted at 60 Hz when the video image data is progressive (60p). In other words, the upper half of FIG. 13 shows a case in which the video image data are received to output the progressive image, the video image data being transmitted from the transmitting device 100 as a result of the processing shown in FIG. 10. Further, a bottom half of FIG. 13 shows a case in which the video image data are transmitted at 60 Hz when the video image data is interlaced (60i) or a case in which the video image data are transmitted at 30 Hz in a progressive manner to output an interlaced video image signal In other words, the bottom half of FIG. 13 shows a case in which the video image data are received to output the interlaced image, the video image data being transmitted from the transmitting device 100 as a result of the processing shown in FIG. 10.

The demuxer 202 receives video image data, voice data, subtitle data etc. transmitted from the transmitting device 100. The demuxer 202 separates the video image data, voice data, subtitle data etc. that are received thereby, and sends the video image data to the decoder 204. The decoder 204 decodes the video image data that are input thereinto. In this way, D3 data shown in FIG. 13 are acquired.

First, a case in which the 60 Hz progressive image (60p) is decoded as the progressive image in the receiving device 200 will be explained, the 60 Hz progressive image being received by the receiving device 200. As shown in the upper half of FIG. 13, the stage D3 data are 1920×1080 pixel data, and are substantially the same data as the stage E3 data in FIG. 10, the stage D3 data being acquired as a result of being decoded by the decoder 204. Namely, the stage D3 data include 1920×540 pixel left eye video image L data in an upper half of the data, and 1920×540 pixel right eye video image R data in a bottom half of the data. Further, in the left eye video image L and the right eye video image R respectively, with respect to a right-half of the 1920×540 pixel data, the data swapping is performed between one frame of the frame-pair and another frame of the frame pair.

After an output from the decoder 204 is input into the deframing portion 206, the deframing portion 206 separates the 1920×1080 pixel data into the left eye video image L and the right eye video image R, and further swaps the right-half data between two consecutive frames (between frame-pairs).

Further, in the deframing portion 206, with respect to the respective 1920×540 pixel data that have been swapped, processing is performed in which one line of the right-half data is inserted between each line of the left-half data. In other words, here, processing opposite to "3. Framing (V-H Repositioned)" described in FIG. 3 is performed. In this way, 960×1080 pixel data are acquired, and the data are sent to the scaler 208.

In the scaler 208, with respect to each of the 960×1080 pixel data, interpolation processing in the horizontal direction is performed. Namely, here, processing opposite to the subsampling described in FIG. 3 is performed. In this way, with respect to the left eye video image L and the right eye video image R respectively, the original 1920×1080 pixel data are acquired.

As described above, when the progressive video image signal is input and the receiving device 200 is a device that can handle the progressive image, with respect to the 1920×540 pixel data that are acquired as a result of separating the left and right video images, the data swapping is performed between two consecutive frames in the deframing portion 206, the two consecutive frames forming the frame-pair. In this way, a state before the data swapping is performed on the transmitting device 100 side is restored. Then, by performing the interpolation processing in the scaler 208 after the data swapping, it is possible to acquire the progressive video image signal (60p) of 60 Hz. In other words, with respect to output data from a 60p decoder, which reads a stream encoded in 60p, the odd line group data are swapped between the 1st frame and the 2nd frame of the frame-pair. After that, the data are merged in each frame such that pixels of respective horizontal structural elements are arranged in the vertical direction alternately between the even line group and the odd line group, and the horizontal and vertical pixels are reconfigured. Then, in a system with the 60p decoder, horizontal interpolation is performed per frame.

Next, based on the bottom half of FIG. 13, a case in which the interlaced video image signal is output when the video image signal transmitted by the transmitting device 100 is progressive will be explained. In such a case in which the receiving device 200 is not compatible with the progressive image, the receiving device 200 can acquire the video image signal as an interlaced video image signal, the video image signal being received by the receiving device 200.

As shown in the bottom half of FIG. 13, when the interlaced video image signal is output, the decoder 204 does not perform decoding on each frame of the input video image signal, but the decoder 204 performs decoding on every other frame of the input video image signal. Therefore, as shown by the stage D3 data in the bottom half of FIG. 13, with respect to the decoded 1920×1080 pixel data, decoding is performed on the 1st frame, but decoding is not performed on the 2nd frame which comes after the 1st frame chronologically at the frequency of 60 Hz. Thus, in this state, the 2nd frame data is not acquired by the receiving device 200.

When the output from the decoder 204 is input into the deframing portion 206, the deframing portion 206 separates the 1920×1080 pixel data into the left eye video image L and the right eye video image R. Further, with respect to the left eye video image L and the right eye video image R respectively, the right-half data of the 1920×540 pixel data are moved to a next subsequent frame which comes after a current frame at the frequency of 60 Hz. As illustrated in FIG. 10, with respect to the data transmitted by the transmitting device 100, the data are swapped between the frames that form the frame-pair. Thus, in the 1st frame of the data transmitted by the transmitting device 100, all the data available when interlaced frames are adjacent to each other at the frequency of 60 Hz are included. Therefore, at stage D4 in the bottom half of FIG. 13, the left-half of the 1960×540 pixel data frame corresponds to the interlaced top frame data, and the right-half of the data frame corresponds to the interlaced bottom frame data. Hence, by moving the right-half of the 1920×540 pixel data frame to the next subsequent frame which is chronologically adjacent to the data at the frequency of 60 Hz, it is possible to acquire the interlaced top field data and the interlaced bottom field data. Note that, in this state, as shown at stage D4 in the bottom half of FIG. 13, the top field frame and the bottom field frame respectively become 960×540 pixel data.

In the scaler 208, the interpolation processing in the horizontal direction is performed on each of the 960×540 pixel data that are input from the deframing portion 206. In this way, with respect to the left eye video image L and the right eye video image R respectively, two 1920×540 pixel data frames that correspond to the interlaced top field and bottom field are acquired. Since the data frames acquired here are the interlaced video image signals, two adjacent frames (top field and bottom field) form one frame image.

In this way, when the receiving device 200 is not compatible with the progressive image, it becomes possible to acquire the interlaced video image signal by having the receiving device 200 perform decoding on every other frame and then by separating the 1920×540 pixel data of the left and right video image signals in the horizontal direction and distributing the data to two consecutive frames.

Further, when the progressive image of 30 Hz is received by the receiving device 200, substantially the same processing as described above in the bottom half of FIG. 13 is performed. When the video image signal transmitted by the transmitting device 100 is the progressive image of 30 Hz, the number of data is halved compared with a case in which the progressive image of 60 Hz is transmitted. Therefore, it is not necessary to perform decoding on every other frame, but all the frames are decoded. In other words, output data from a 30p decoder or a 60i decoder are displayed while delaying a display timing of the odd line group by one half (½) frame cycle, or the output data are moved to a buffer that is provided to display the interlaced bottom field, the 30p decoder and the 60i decoder reading the stream encoded in 60p. In this way, the 30p decoder decodes only one frame of the frame-pair, and the 60p decoder decodes every frame of the frame-pair. Further, in a system with the 30p decoder, the horizontal interpolation is performed on every interlaced field. In addition, it is also possible to perform filtering in the vertical direction as necessary.

Figure 14:
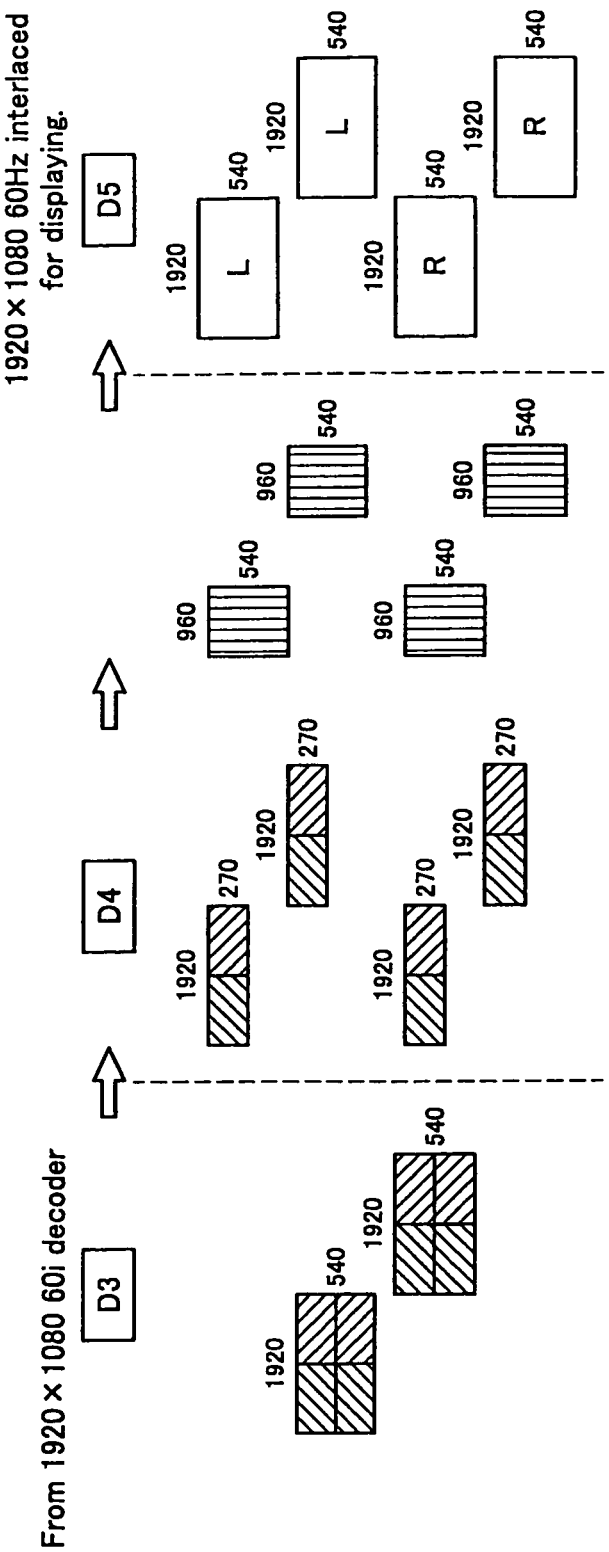
FIG. 14 is a schematic diagram showing a case in which, when the receiving device receives a 60 Hz interlaced video image signal (60i), the video image signal is decoded as an interlaced signal on a receiving device side.

FIG. 14 shows a case in which an interlaced video image signal of 60 Hz (60i) is decoded on the receiving device 200 side as an interlaced video image signal, when the interlaced video image signal of 60 Hz (60i) is received by the receiving device 200. In other words, FIG. 14 shows a case in which the interlaced image is output after receiving the video image data transmitted by the transmitting device 100 as a result of the processing shown in FIG. 11. In this case, processing opposite to the processing illustrated in the bottom half of FIG. 2 or FIG. 11 is performed. Namely, in the deframing portion 204, left and right 1920×540 pixel video image data which are output from the decoder 204 are separated (stage D4), and with respect to 1920×270 pixel data, two lines of right-side data are inserted into a left-side of the 1920×270 pixel data two lines at a time such that 960×540 pixel data are acquired. After that, the interpolation processing in the horizontal direction is performed in the scaler 206, and with respect to the left and right video image data respectively, two 1920×540 pixel frames (top field and bottom field) are acquired. In this way, every two horizontal lines of the output data from the 60i decoder, which reads the stream encoded in 60i, are merged such that the pixels of the respective horizontal structural elements are arranged alternately in the vertical direction between the even line group and the odd line group, and the horizontal and vertical pixels are reconfigured.

According to a system provided with the transmitting device 100 and the receiving device 200 described above, it is possible to ensure compatibility between the progressive image and the interlaced image. Therefore, in either case in which the image transmitted from the transmitting device 100 is progressive or interlaced, the receiving device 200 can acquire the video image signal as the progressive video image signal or the interlaced video image signal, depending on whether the receiving device 200 is compatible with the progressive image or the interlaced image. Note that when the receiving device 200 is compatible with the progressive image, normally it is also compatible with the interlaced image, so all the processing shown in FIG. 13 and FIG. 14 can be performed.

As described above, in the case of the progressive image, the transmitting device 100 transmits to the receiving device 200 the left and right video image data shown in the right-side of FIG. 10 after the left and right video image data are encoded. Further, in the case of the interlaced image, the transmitting device 100 transmits to the receiving device 200 the video image data shown in the right-side of FIG. 11 after the video image data are encoded.

In the receiving device 200, it is determined whether a received image is progressive or interlaced based on a received video image signal. In addition, in the receiving device 200, a frame frequency is acquired, and the processing shown in the upper half of FIG. 13, the bottom half of FIG. 13 or FIG. 14 is performed. A technique to determine which processing is performed in the receiving device 200 will be explained below.

The transmitting device 100 transmits scalable frame information as Supplement Enhancement Information (SEI) per access unit, namely, per picture. 60 Hz frames are grouped into pairs of every two frames, and assuming that the frames are interlaced, the first frame (1st frame) and the second frame (2nd frame) form the frame-pair.

FIG. 15 is a schematic diagram showing a signaling syntax of a 60p/60i scalability. As shown in FIG. 15, when the video image data are progressive, a progressive_frame_flag is regarded as "1". Therefore, in the receiving device 200, it is possible to determine whether transmitted data are progressive or interlaced by checking the progressive_frame_flag. Then, based on the determination result, one of the processing in the upper half of FIG. 13, the bottom half of FIG. 13 and FIG. 14 can be performed.

Further, as shown in FIG. 15, when the progressive_frame_flag is "1", it is further specified from a 1st_frame_indicator whether or not a current frame is a 1st_frame. In addition, it is specified from an alternative_frame_pair_indicator whether or not an alternative frame is a next frame.

As described above, in the transmitting device 100, each flag shown in FIG. 15 is set, and the flag is inserted into the video image signal. In the receiving device 200, by identifying the flags, framing processing is performed in accordance with whether the video image signal is progressive or interlaced. In this way, it becomes possible to ensure the compatibility between the progressive image and the interlaced image.

The technique according to the present embodiment can be applied to not only a three-dimensional video image signal, but also to a two-dimensional video image signal. FIG. 16 is a schematic diagram showing a case in which processing is performed on the two-dimensional video image signal on the transmitting device 100 side. FIG. 16 is a schematic diagram showing an example of a case in which the processing is performed on a high-definition (HDD) two-dimensional video image signal, the video image signal being formed with individual 1920×1080 pixel frames.

As shown in FIG. 16, in a case of the two-dimensional video image signal, processing is performed in the framing portion 104 without performing the subsampling. In the framing portion 104, odd-numbered lines are moved to the right side per frame with one horizontal line being regarded as a unit, and lines are grouped into 1920×540 pixel even line groups and 1920×540 pixel odd line groups. Then, respective odd line groups are swapped between the first frame (1st frame) and the second frame (2nd frame), the first frame and the second frame forming the frame-pair. In this way, assuming that the interlaced frame is used instead of the progressive frame, all the structural elements of the interlaced frame can be included in the first frame (1st frame) of the progressive frame-pair. Therefore, when the interlaced decoding is performed, both the interlaced top frame and the interlaced bottom frame can be formed by decoding only the 1st frame of the progressive frame-pair.

1920×1080 pixel data that are acquired as a result of the data swapping are input into the encoder 106. The encoder 106 encodes the 1920×1080 pixel data per frame, and sends the data to the receiving device 200.

In the receiving device 200, when the progressive image is output, in a similar manner as illustrated in the upper half of FIG. 13, the data swapping is performed in the deframing portion 208 on the data output from the decoder 204. Further, when the progressive image is output, in a similar manner as illustrated in the bottom half of FIG. 13, decoding is performed on every other frame, and among the 1920×1080 pixel data, data in the even line groups are regarded as data for the current frame, and data in the odd line groups are moved to a next subsequent frame following the current frame. Note that, either in the progressive case and the interlaced case, processing in the scaler 208 is not required, since the subsampling is not performed on the transmitting device 100 side.

Figure 17:
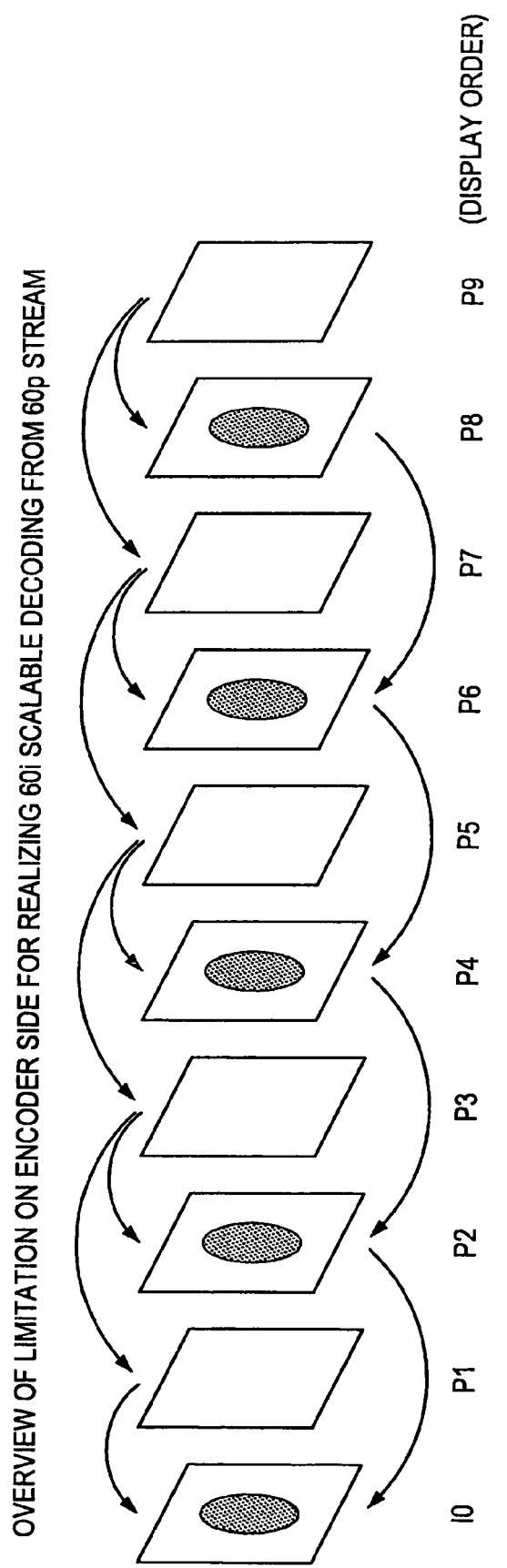
FIG. 17 is a schematic diagram showing a limitation in the receiving device when processing shown in a bottom half of FIG. 13 is performed.

FIG. 17 is a schematic diagram showing a limitation in the receiving device 200 when processing shown in the bottom half of FIG. 13 is performed. With respect to an encoding stream shown in FIG. 17, the 60p decoder decodes all the frame-pairs. Among the frame-pairs, the 30p decoder decodes only even-numbered pictures shown in FIG. 17. The 30p decoder searches a next even-numbered picture of the frame-pairs without decoding odd-numbered pictures, and decodes the next even-numbered picture at an appropriate timing.

In FIG. 17, the even-numbered picture forms the frame-pair with the odd-numbered picture subsequent to the even-numbered picture. In the encoder 204, among the frame-pairs, when time prediction is performed on the even-numbered pictures shown in FIG. 17 (pictures marked by hatching in FIG. 17), only the even-numbered pictures can be referred to. With respect to the odd-numbered pictures, there is no limitation on the pictures that can be referred to. Note that, with respect to an application of a B picture and an upper limit of the number of reference frames, MPEG standards etc. are complied with.

As described above, according to the first embodiment, when the three-dimensional image is transmitted, with respect to the resolution in the vertical direction, the high resolution of the source image level can be maintained, since the sampling is performed in the horizontal direction. Further, in the interlaced image, it is possible to achieve an image quality at substantially the same level as Side-by-Side. Further, in comparison with an approach (Checker Board etc.) in which L and R are mixed at the pixel level, it is possible to increase encoding efficiency significantly, since it is possible to maintain the degree of correlation among adjacent pixels.

2. Second Embodiment

Next, a second embodiment of the present invention will be explained. With respect to the video image data on which framing is performed using the technique according to the first embodiment, the second embodiment specifies a predetermined data range and provides a desired video image to the viewer.

Figure 18:
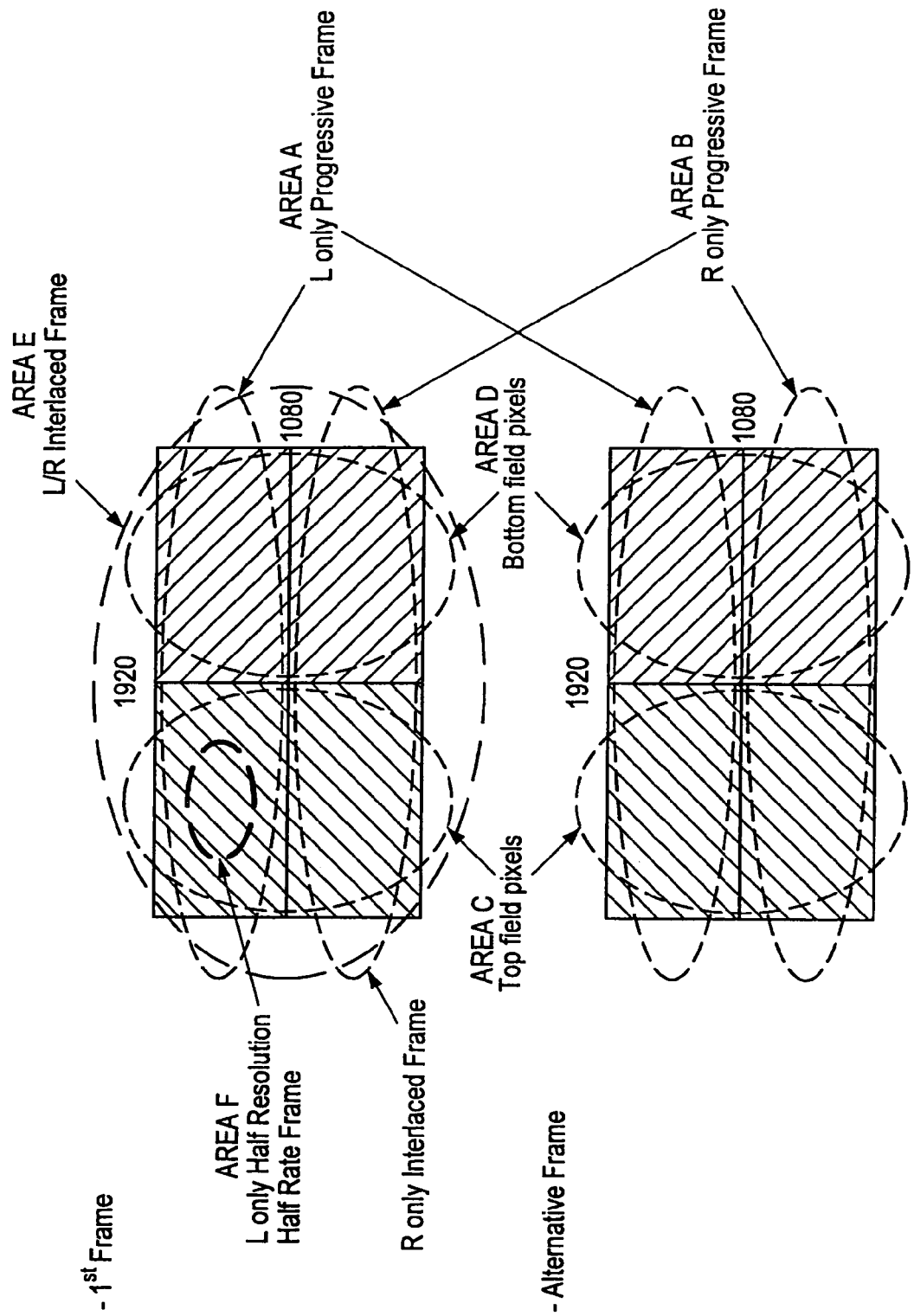
FIG. 18 is a schematic diagram showing video image data decoded by a decoder of the receiving device after the video image data is transmitted from the transmitting device.

As described with respect to the first embodiment, in the transmitting device 100, the progressive image and the interlaced image are encoded respectively through the processing in the scaler 102 and the framing portion 104. FIG. 18 is a schematic diagram showing video image data decoded by the decoder 204 of the receiving device 200.

FIG. 18 shows a frame-pair decoded by the decoder 204, the frame-pair corresponding to data located in a leftmost position in the upper or bottom half of FIG. 13 or to data located in a leftmost position in FIG. 14.

By performing the processing in the scaler 102 and the framing portion 104, as described with respect to the first embodiment, it is possible to select different video image data by specifying different data areas shown in FIG. 18.

A detailed explanation will be given below. First, when the frame-pair shown in FIG. 18 is the first progressive frame and the second progressive frame, if data in an area A are specified on the receiving device 200 side, only the left eye progressive video image L can be acquired. In addition, if data in an area B are specified, only the right eye progressive video image R can be acquired.

Further, when frames shown in FIG. 18 are interlaced frames, namely, when the frames shown in FIG. 18 are the frames shown on the leftmost side in the bottom half of FIG. 13, if data in an area C are specified on the receiving device 200 side, left and right video images of the interlaced top field can be acquired. In addition, if data in an area D are specified, left and right video images of the interlaced bottom field can be acquired.

Further, when the frames shown in FIG. 18 are the interlaced frames, if data in an area E are specified on the receiving device 200 side, left and right interlaced video images can be acquired. In addition, when the frames shown in FIG. 18 are the interlaced frames, if data in an area F are specified on the receiving device 200 side, it is possible to acquire the left eye video image L at a half resolution compared to a normal resolution.

Figure 19:
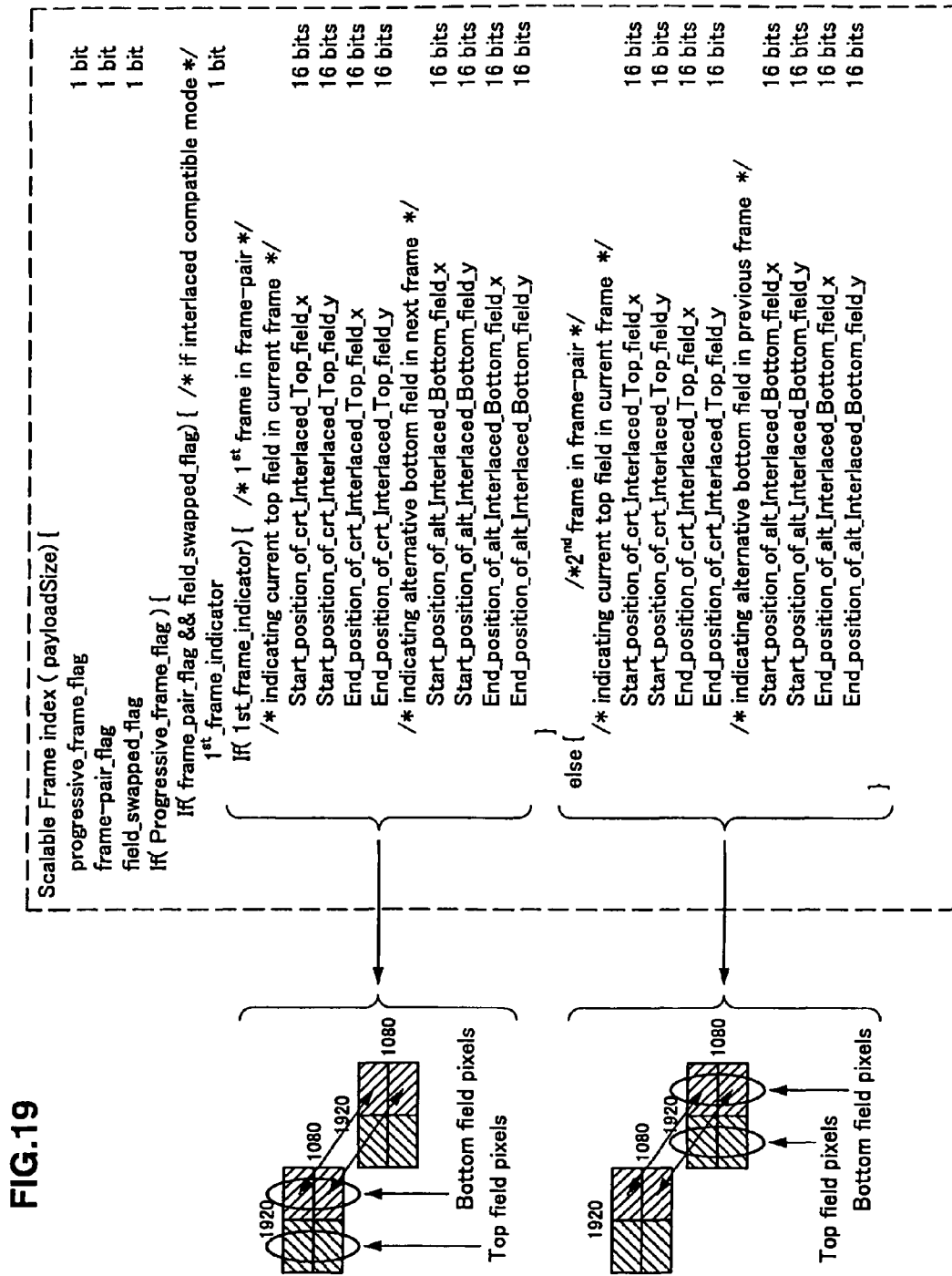
FIG. 19 is a schematic diagram showing an example of identification information.
Figure 20:
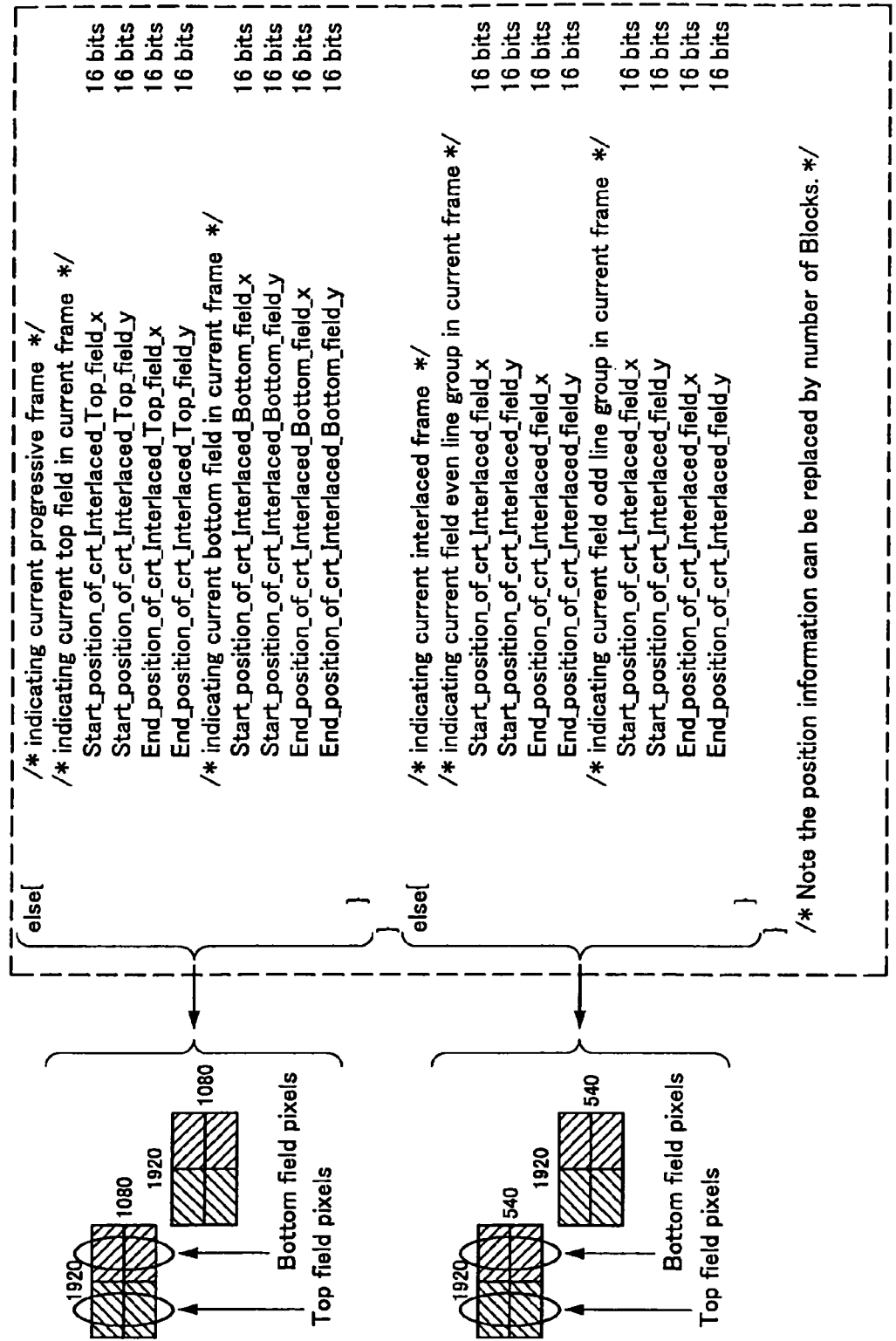
FIG. 20 is a schematic diagram showing an example of identification information.

The transmitting device 100 transmits identification information to the receiving device 200 such that the receiving device 200 can select an appropriate area illustrated in FIG. 18, the identification information indicating the area. At this time, the identification information is inserted into the video image signal in the framing portion 104 of the transmitting device 100. Further, on the receiving device 200 side, the identification information is extracted and acquired from the video image signal in the deframing portion 206. FIG. 19 and FIG. 20 are schematic diagrams showing an example of the identification information. Information shown in FIG. 19 and FIG. 20 also can be transmitted as SEI user data.

In the example shown in FIG. 19 and FIG. 20, it is possible to specify one of the areas A to F shown in FIG. 18 by specifying x coordinates and y coordinates of a start position and an end position in each frame shown in FIG. 18. Therefore, by inserting the identification information into the user data on the transmitting device 100 side, the identification information specifying a desired range, it is possible to acquire video images within the range specified based on the identification information on the receiving device 200 side.

As described above, according to the second embodiment, it becomes possible to acquire the desired video image by specifying the area within the frame of either the progressive or interlaced video image data.

The exemplary embodiments of the present invention are described in detail above with reference to the appended drawings. However, the present invention is not limited to the above-described examples. It should be understood by those skilled in the art that various modifications, combinations, sub-combinations and alterations may occur depending on design requirements and other factors insofar as they are within the scope of the appended claims or the equivalents thereof.

What is claimed is:

1. A transmitting device, comprising:
a framing portion that outputs a video image signal, which is acquired per frame, wherein the video image signal is a signal of one of a left eye video image and a right eye video image that form a three-dimensional image, has data extracted at every predetermined number of lines in a vertical direction, positions the extracted data in a different area in the same frame at every such predetermined number of lines, and inserts information specifying a chosen area selected from among a plurality of different areas within the frame with respect to data of the frame in which the left eye video image data and the right eye video image data are merged in which the chosen area is specified by specifying coordinates of a start position and an end position thereof; and
an encoder that encodes an output from the framing portion such that the video image signal is transmitted to a receiving device,
wherein when the framing portion is compatible with a progressive image, the framing portion produces the output after swapping the data positioned in the different area between two consecutive frames, and
when the framing portion is compatible with an interlaced image, the framing portion produces the output without performing the swapping.

2. The transmitting device according to claim 1, wherein after extracting the data at every predetermined number of lines and positioning the data in the different area within the same frame, the framing portion merges the left eye video image data and the right eye video image data that correspond to each other chronologically and outputs the merged data as one frame.

3. The transmitting device according to claim 1, wherein, when the framing portion is compatible with the progressive image, the framing portion produces the output after extracting data on every other line in the vertical direction and positioning the data in the different area.

4. The transmitting device according to claim 1, wherein, when the framing portion is compatible with the interlaced image, the framing portion produces the output after extracting one set of data and positioning the set of data in the different area, the set of data consisting of two lines of data in the vertical direction.

5. The transmitting device according to claim 1, further comprising:
a scaler that operates at a previous stage of the framing portion, the scaler subsampling the video image signal in a horizontal direction.

6. The transmitting device according to claim 1, wherein the plurality of different areas include a first area representative of top field pixels and a second area representative of bottom field pixels.

7. A receiving device, comprising:
a decoder that decodes a video image signal that is transmitted by a transmitting device and is acquired per frame, wherein the video image signal that is acquired per frame is a video image signal in which a left eye video image and a right eye video image are positioned in a predetermined area within each frame, the left eye video image and the right eye video image forming a three-dimensional image; and
a framing portion that produces an output after extracting information specifying a chosen area selected from among a plurality of different areas within the frame with respect to data of the frame in which the left eye video image data and the right eye video image data are merged in which the chosen area is specified by specifying coordinates of a start position and an end position thereof, separating the left eye video image and the right eye video image with respect to each of the frames, and inserting data of a second area within the chosen area with respect to data of a first area within the chosen area of the same frame at every predetermined number of lines,
wherein when the framing portion is compatible with a progressive image, the framing portion inserts the data of the second area with respect to the data of the first area within the same frame at every predetermined number of lines after swapping the data positioned in the second area within the frame between two consecutive frames, and
when the framing portion is compatible with an interlaced image, the framing portion outputs the data positioned in the first area within the frame as data of a current frame, and outputs the data positioned in the second area as data of a next frame.

8. The receiving device according to claim 7, further comprising:
a scaler that operates at a subsequent stage of the framing portion, the scaler subsampling the video image signal in a horizontal direction.

9. The receiving device according to claim 7, wherein, when the framing portion is compatible with the progressive image, the framing portion inserts a line of data of the first area between every line of the data of the second area.

10. The receiving device according to claim 7, wherein, when the framing portion is compatible with the interlaced image, the framing portion inserts two lines of data of the first area between every two lines of data of the second area.

11. A communication system, comprising:
a transmitting device; and
a receiving device;
the transmitting device including:
a first framing portion that outputs a video image signal, which is acquired per frame, wherein the video image signal is a signal of one of a left eye video image and a right eye video image that form a three-dimensional image, has data extracted at every predetermined number of lines in a vertical direction, positions the extracted data in a different area in the same frame at every such predetermined number of lines, and inserts information specifying a chosen area selected from among a plurality of different areas within the frame with respect to data of the frame in which the left eye video image data and the right eye video image data are merged in which the chosen area is specified by specifying coordinates of a start position and an end position thereof, and
an encoder that encodes an output from the first framing portion such that the video image signal is transmitted to a receiving device,
wherein, when the first framing portion is compatible with a progressive image, the first framing portion produces the output after swapping the data positioned in the different area between two consecutive frames, and when the first framing portion is compatible with an interlaced image, the first framing portion produces the output without performing the swapping; and
the receiving device including:
a decoder that decodes the video image signal that is transmitted by the transmitting device and is acquired per frame, and
a second framing portion that produces an output after extracting the information specifying the coordinates of the start position and the end position of the chosen area within the frame with respect to data of the frame in which the left eye video image data and the right eye video image data are merged, separating the left eye video image and the right eye video image with respect to each of the frames, and inserting data of a second area within the chosen area with respect to data of a first area within the chosen area of the same frame at every predetermined number of lines, wherein when the second framing portion is compatible with a progressive image, the second framing portion inserts the data of the second area with respect to the data of the first area within the same frame at every predetermined number of lines after swapping the data positioned in the second area between two consecutive frames, and when the second framing portion is compatible with an interlaced image, the second framing portion outputs the data positioned in the first area within the frame as data of a current frame, and outputs the data positioned in the second area as data of a next frame.

12. A computer program stored on a non-transitory recording medium that comprises instructions that command a computer to function as:

an outputting device that outputs a video image signal that is a signal of one of a left eye video image and a right eye video image that form a three-dimensional image, which has data extracted at every predetermined numbers of lines in the vertical direction, positions the data in a different area in the same frame at every such predetermined number of lines, and inserts information specifying a chosen area selected from among a plurality of different areas within the frame with respect to data of the frame in which the left eye video image data and the right eye video image data are merged in which the chosen area is specified by specifying coordinates of a start position and an end position thereof, wherein when the outputting device is compatible with a progressive image, the outputting device produces the output after swapping the data positioned in the different area between two consecutive frames, and when the outputting device is compatible with an interlaced image, the outputting device produces the output without performing the swapping; and an encoding device that encodes an output from the outputting device such that the video image signal is transmitted to a receiving device.

13. A computer program stored on a non-transitory recording medium that comprises instructions that command a computer to function as:

a decoding device that decodes a video image signal that is transmitted by a transmitting device and is acquired per frame, wherein the video image signal that is acquired per frame is a video image signal in which a left eye video image and a right eye video image are positioned in a predetermined area within each frame, the left eye video image and the right eye video image forming a three-dimensional image; and an outputting device that produces an output after extracting information specifying a chosen area selected from among a plurality of different areas within the frame with respect to data of the frame in which the left eye video image data and the right eye video image data are merged in which the chosen area is specified by specifying coordinates of a start position and an end position thereof, separating the left eye video image and the right eye video image with respect to each of the frames, and inserting data of a second area within the chosen area with respect to data of a first area within the chosen area of the same frame at every predetermined number of lines, wherein when the outputting device is compatible with a progressive image, the outputting device inserts the data of the second area with respect to the data of the first area within the same frame at every predetermined number of lines after swapping the data positioned in the second area within the frame between two consecutive frames, and when the outputting device is compatible with an interlaced image, the outputting device outputs the data positioned in the first area within the frame as data of a current frame, and outputs the data positioned in the second area as data of a next frame.

\* \* \* \* \*